United States Patent [19]

Thomas et al.

[11] Patent Number: 5,454,597

[45] Date of Patent: Oct. 3, 1995

[54] LIGHTWEIGHT CHASSIS-CONTAINER CONSTRUCTION

[75] Inventors: Michael I. Thomas; Charles R. Fetz; Daniel J. McCormack, all of Savannah, Ga.

[73] Assignee: Great Dane Trailers, Inc., Savannah, Ga.

[21] Appl. No.: 55,150

[22] Filed: Apr. 29, 1993

[51] Int. Cl.⁶ .................................................. B62D 63/06
[52] U.S. Cl. ............................. 280/789; 280/DIG. 8; 296/181
[58] Field of Search ............................ 280/781, 789, 280/791, 493, 423.1, 794, DIG. 8, 404; 296/181, 182

[56] References Cited

U.S. PATENT DOCUMENTS

| | | | |
|---|---|---|---|
| 2,834,495 | 5/1958 | Norbom | 280/DIG. 8 |
| 3,027,025 | 3/1962 | Tantlinger | 280/DIG. 8 |
| 3,130,688 | 4/1964 | Gutridge et al. | 280/DIG. 8 |
| 3,321,214 | 5/1967 | Tantlinger | 280/789 |
| 3,587,890 | 6/1971 | Hyland | 280/DIG. 8 |
| 4,125,077 | 11/1978 | Baaso | 280/DIG. 8 |
| 4,595,231 | 6/1986 | Bennett et al. | 296/181 |
| 5,199,732 | 4/1993 | Lands et al. | 280/407.1 |

OTHER PUBLICATIONS

Stoughton Midel ASDCW Catalog date approx. 1989, 4 pages.
Stoughton Catalog (Domestic Container and 3" Gooseneck Chassis, approx date mid 1992, 4 pages.
Monon Chassis Specifications and drawings, 5 Sheets Jan. 1992.
West Lake Intermodal, Inc., Corner Fittings Twistlocks, 3 pages—Jan. 1992.
General Assembly drawing, 1 Sheet—late 1989.
Monon Dry Freight Domestic Container Drawings, dated approx. mid–1988, 12 Sheets.
"Cargo Systems Newsletter, U.S. Domcon Breakthrough" article, Nov. 1992.
Buffers USA Catalog, 32 Pages—Jan. 1992.
Buffers USA Catalog, 2 Sheets—Jan. 1992.
Buffers USA Catalog, spec. sheet, 2 Pages—1992.
Blair Good Ideas in Practice—Container Products Catalog, 12 Sheets—1992.
Blair Drawings, 1992, 4 Sheets.
Stoughten Drawings, 1992, 3 Sheets.
Stoughten Drawings, 1992, 1 Sheet.

*Primary Examiner*—Kenneth R. Rice
*Assistant Examiner*—Paul N. Dickson
*Attorney, Agent, or Firm*—William Squire; Elliot M. Olstein

[57] ABSTRACT

A pair of main beams, a plurality of diagonal cross braces and transverse beams having a beam height of about 75% of prior art main beam heights provide a relatively flexible chassis. A clamp assembly central of the chassis clamps a cubicle cargo container central region to the chassis to rigidify the chassis. The cargo container is connected to the chassis front and rear by conventional bolster pin and twist lock assemblies. An upper container casting has an opening for receiving an interbox twist lock connector aligned on an axis closely spaced to the side panels of upper and lower containers on a rail car to minimize bending loads on lower container intermediate support posts. Lower castings at the base of each of the intermediate posts mate with a lower container upper castings in a stacked arrangement on a rail car. The chassis has a bogie assembly receiving channel for slidably receiving a bogie locked to the chassis by a conventional retractable pin mechanism. The container tunnel has a trapezoidal transverse section which mates with a chassis goose neck which is 10% narrower than and about 50% the vertical height of prior goose necks.

14 Claims, 15 Drawing Sheets

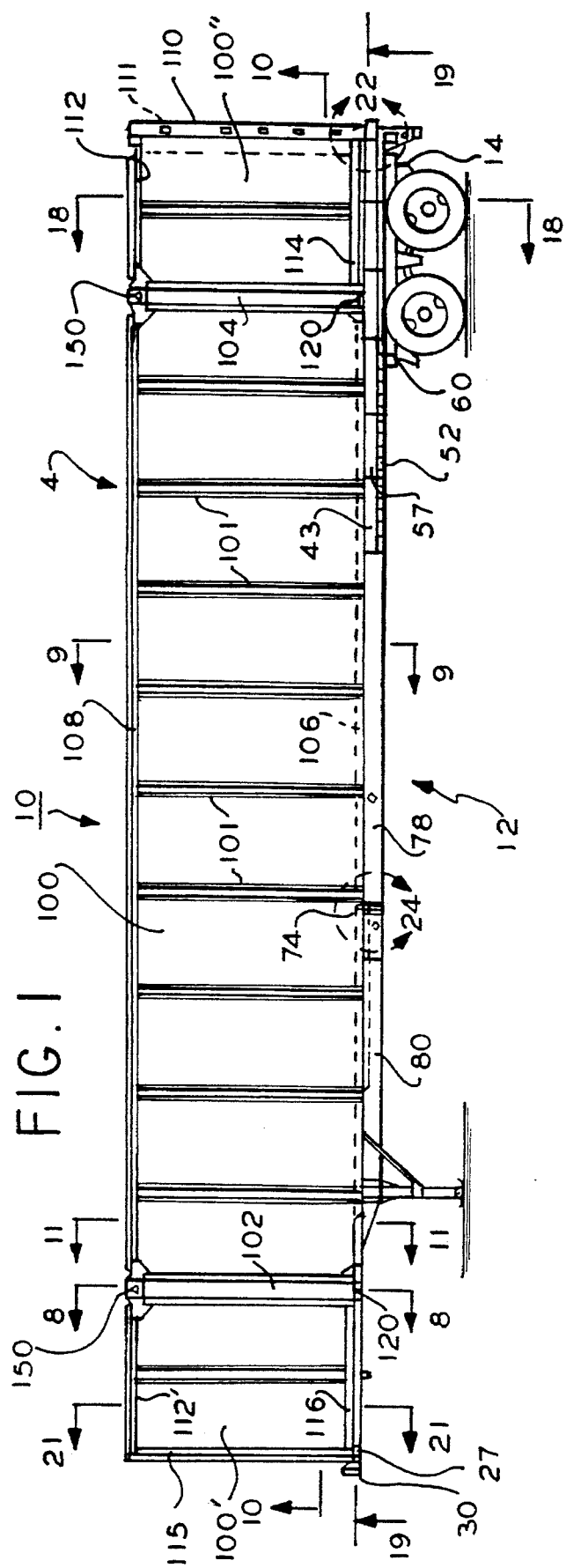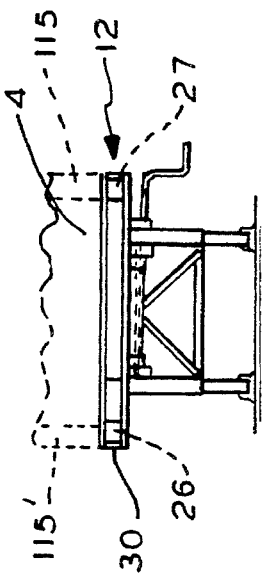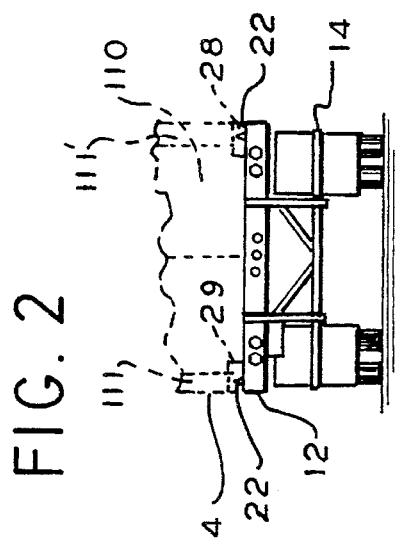

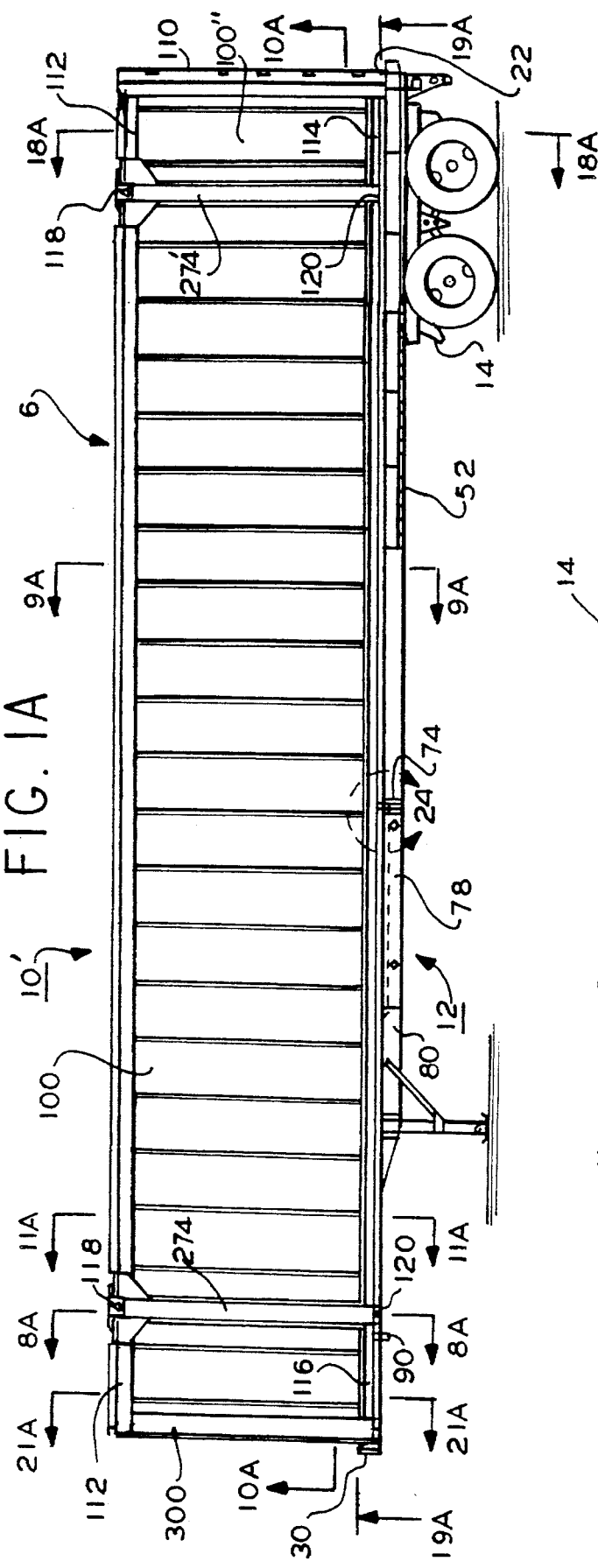
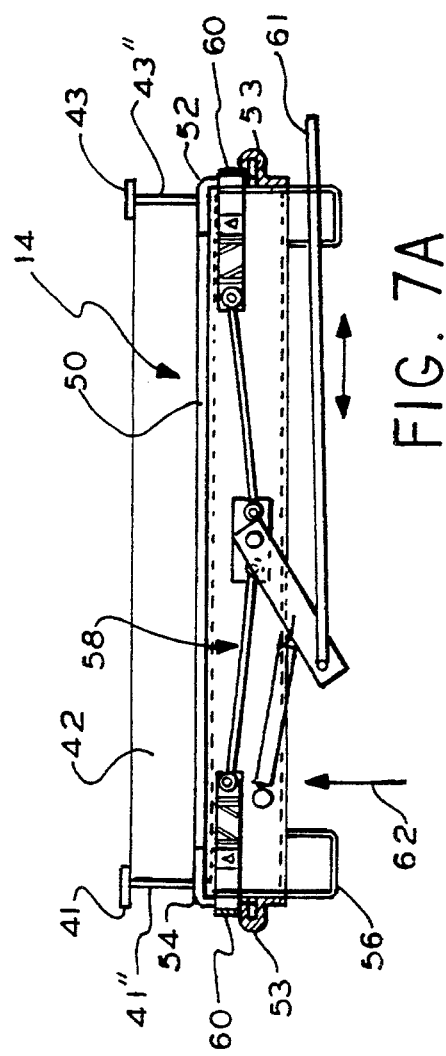

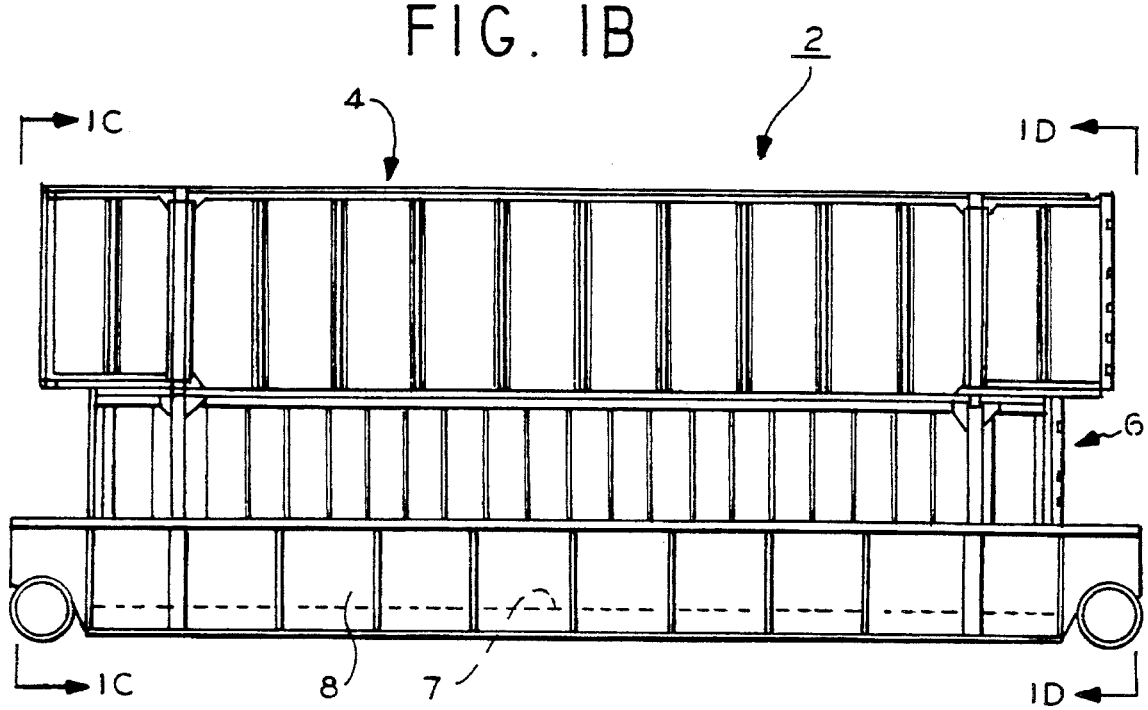
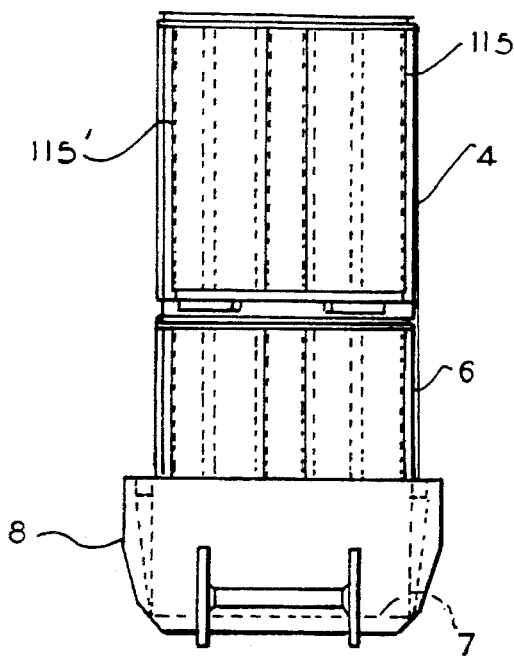
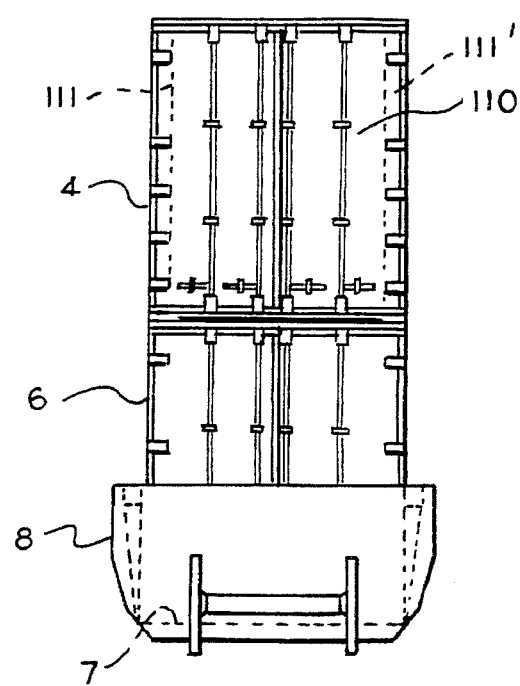

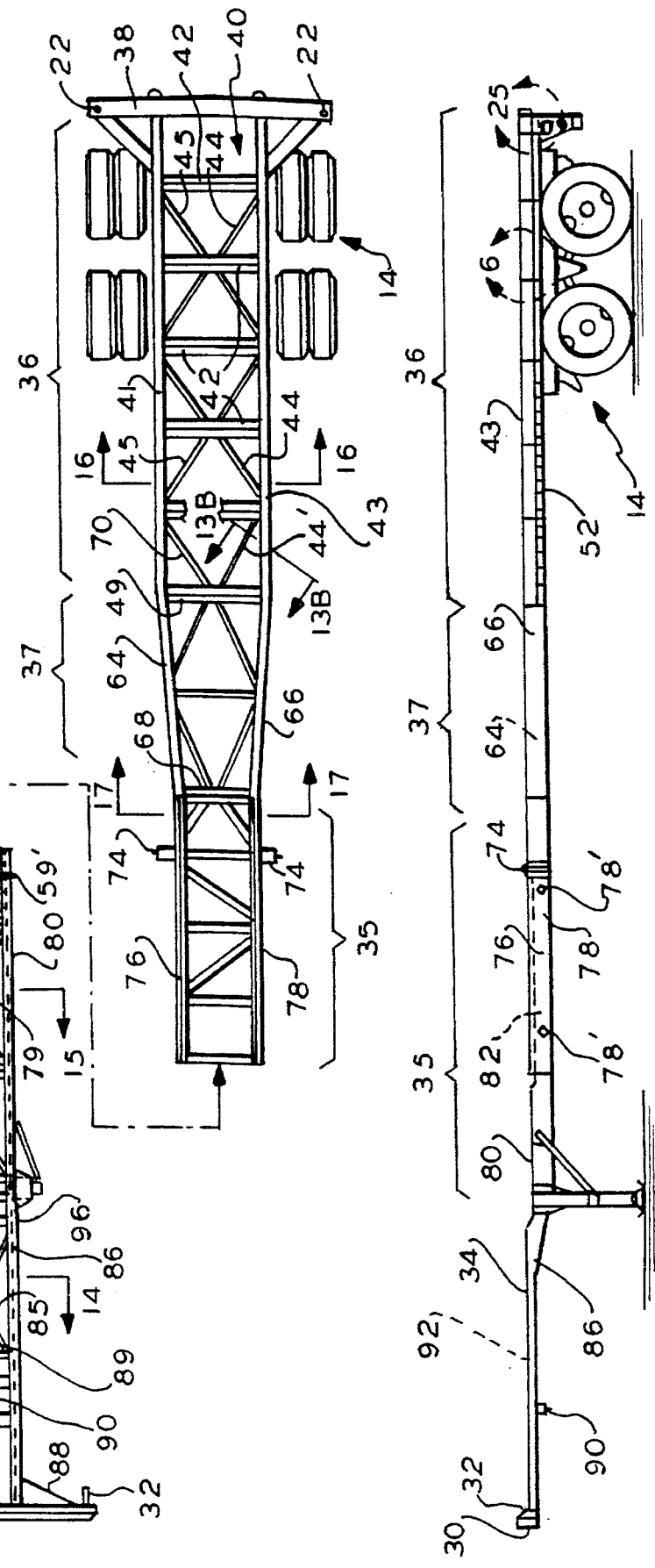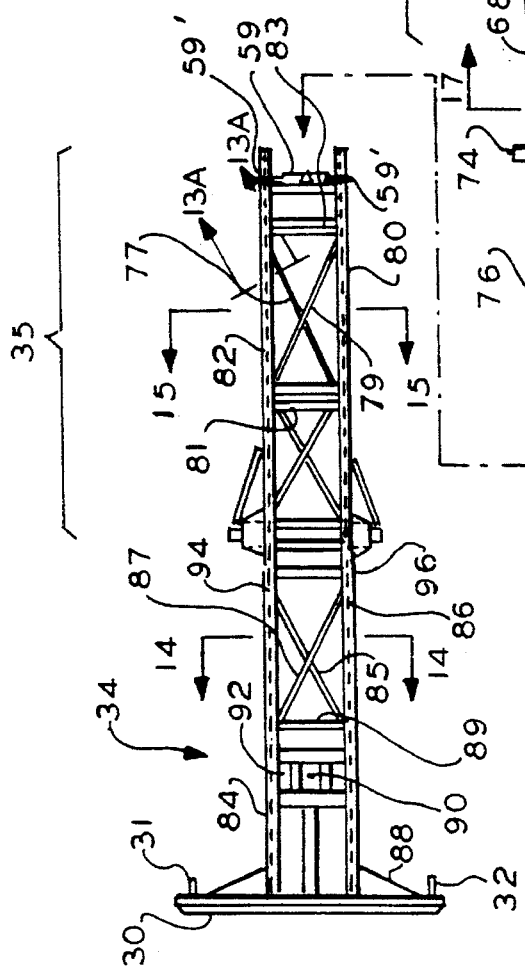

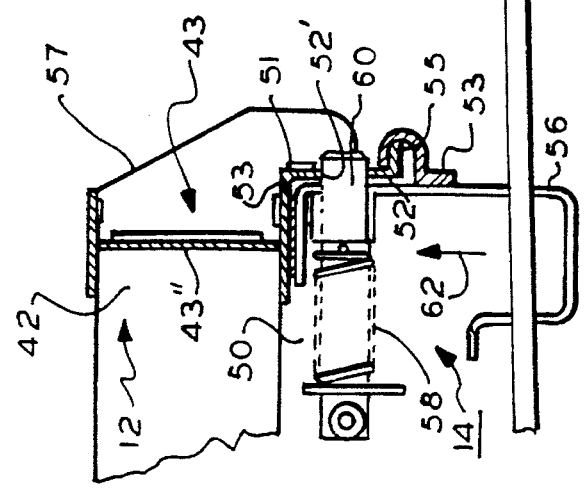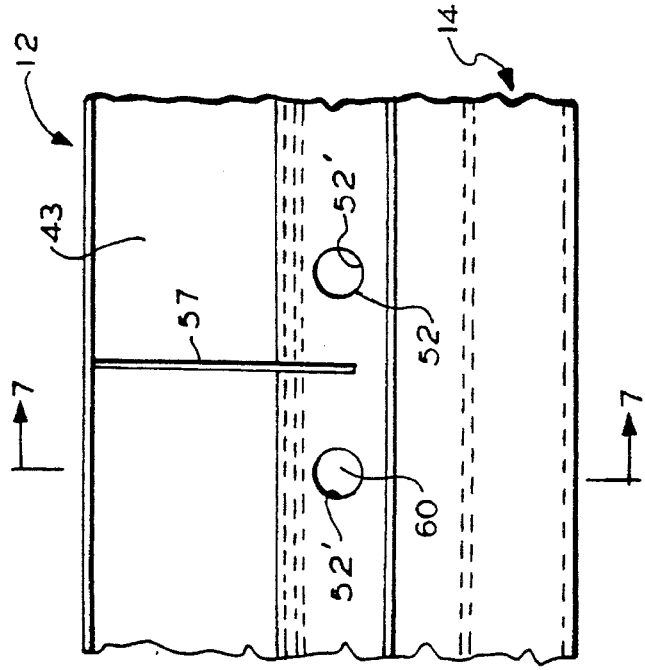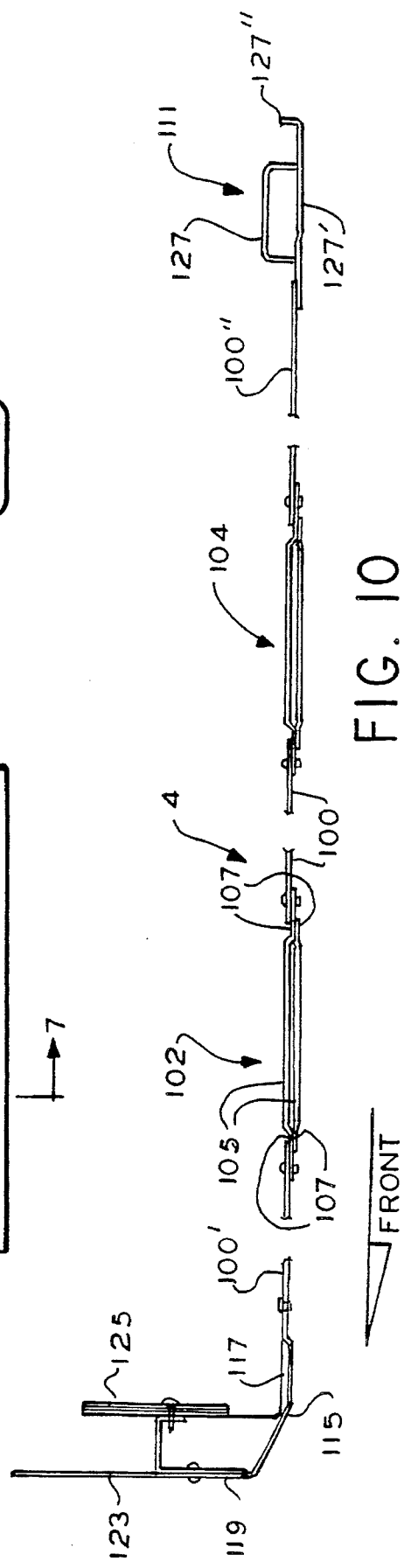

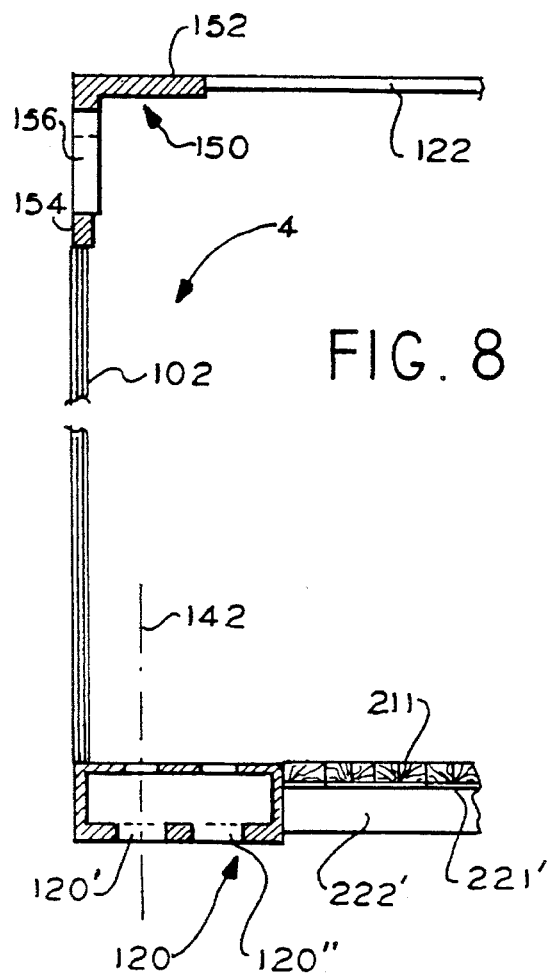
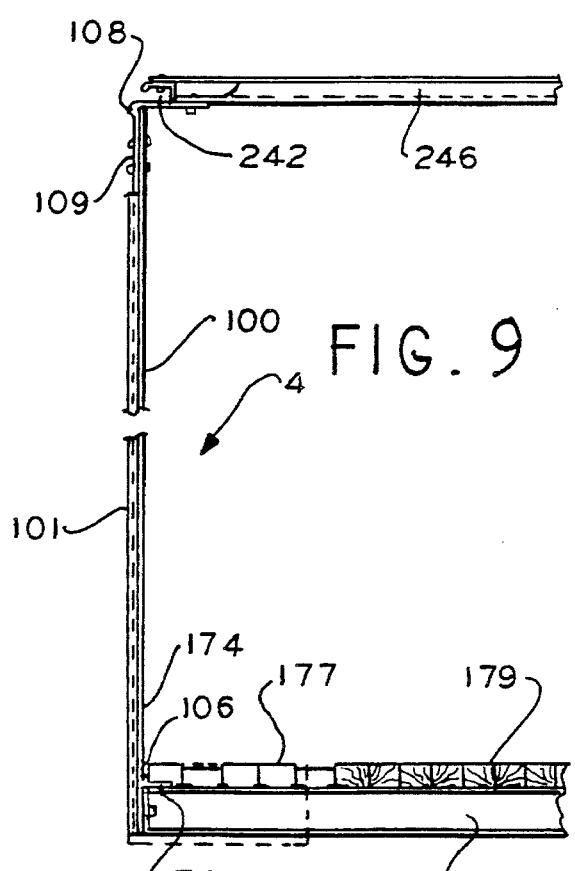
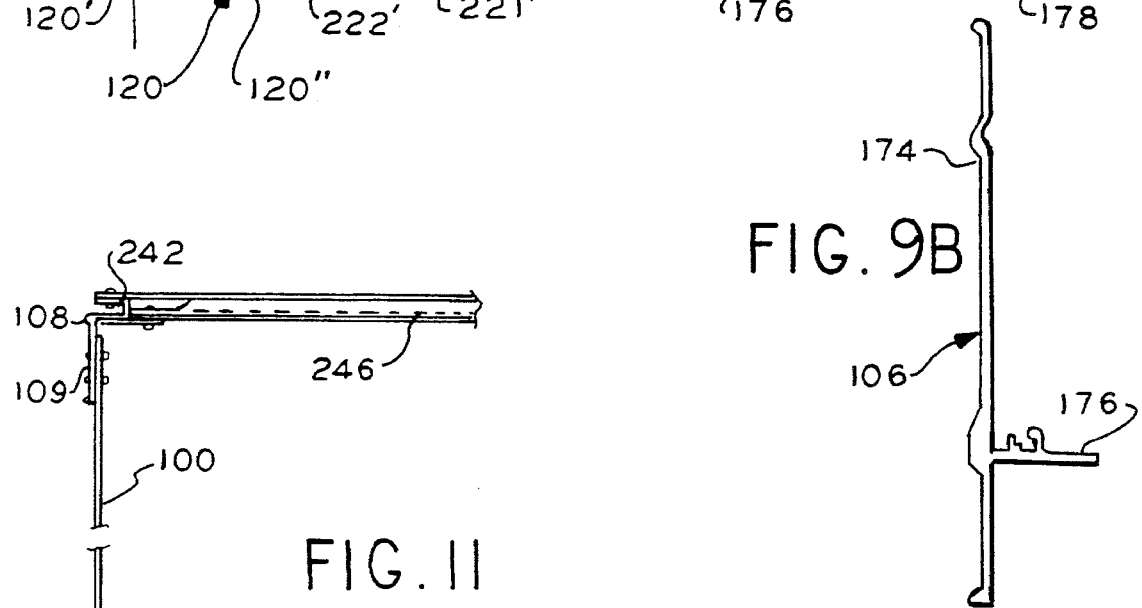
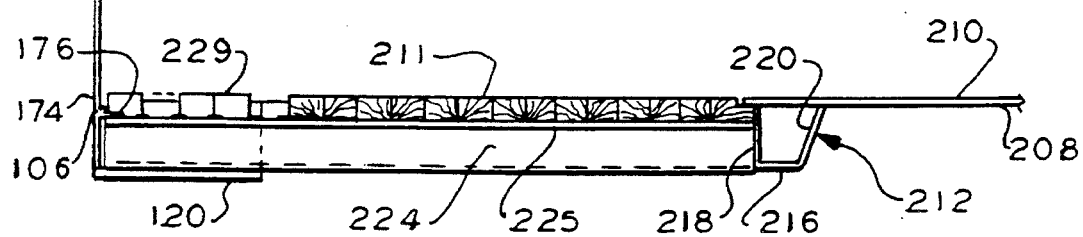

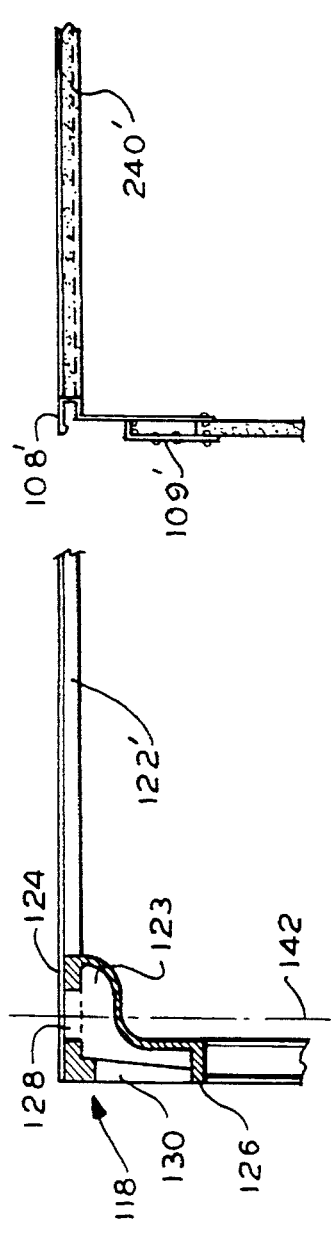

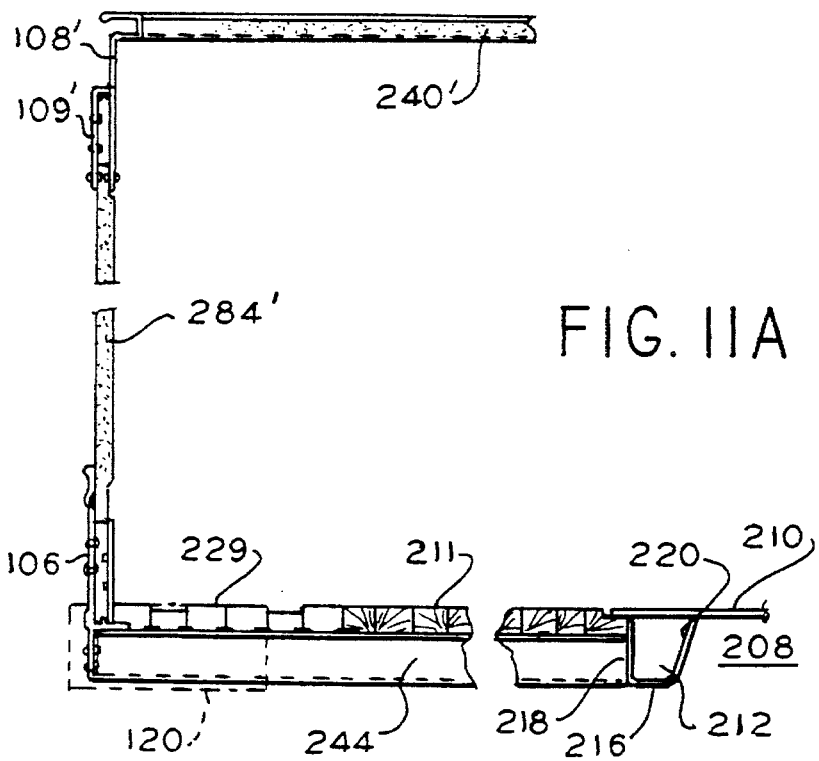
FIG. 11A
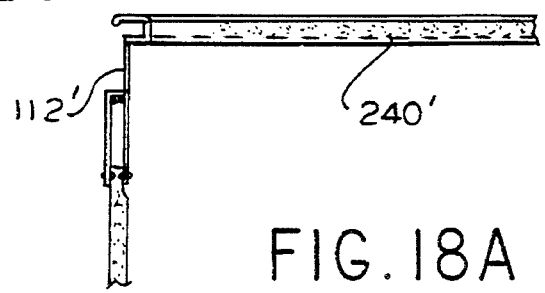
FIG. 18A
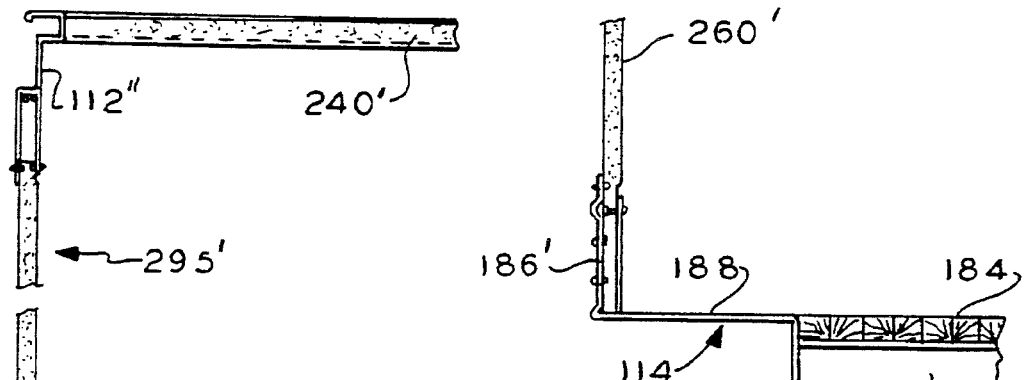
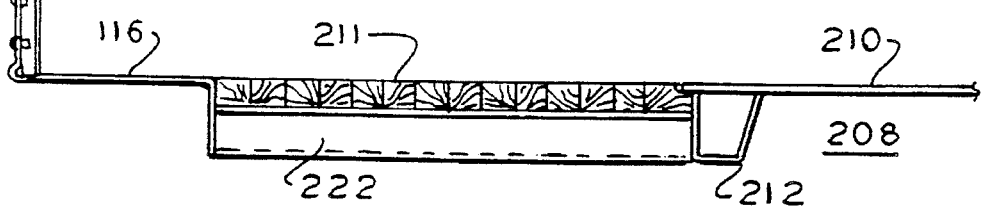
FIG. 21A

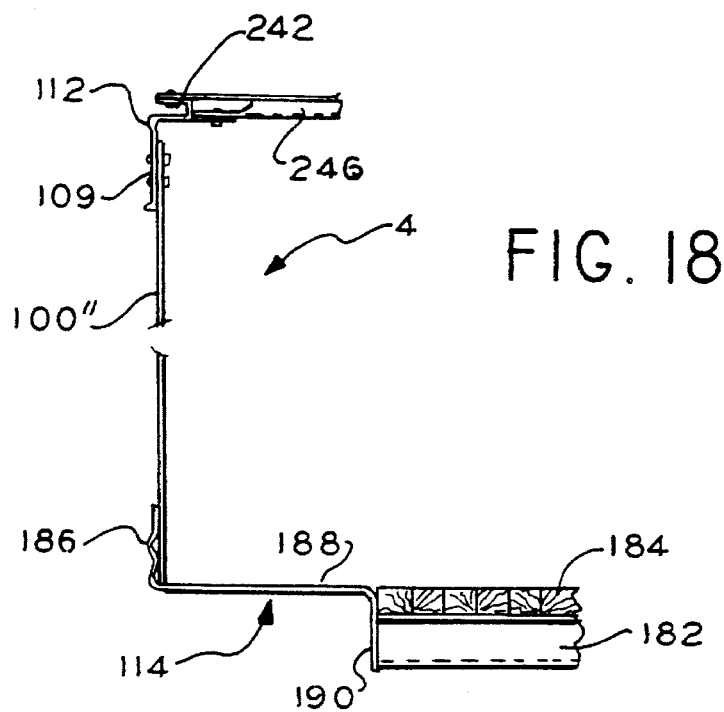
FIG. 18
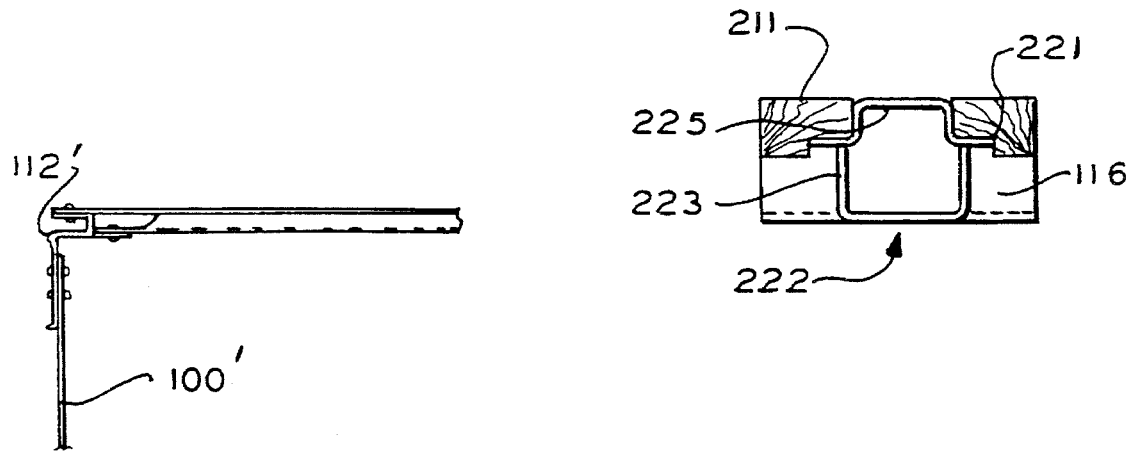
FIG. 20
FIG. 21
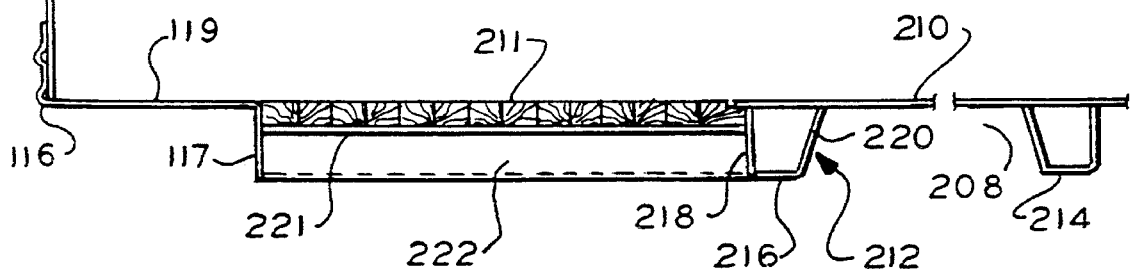

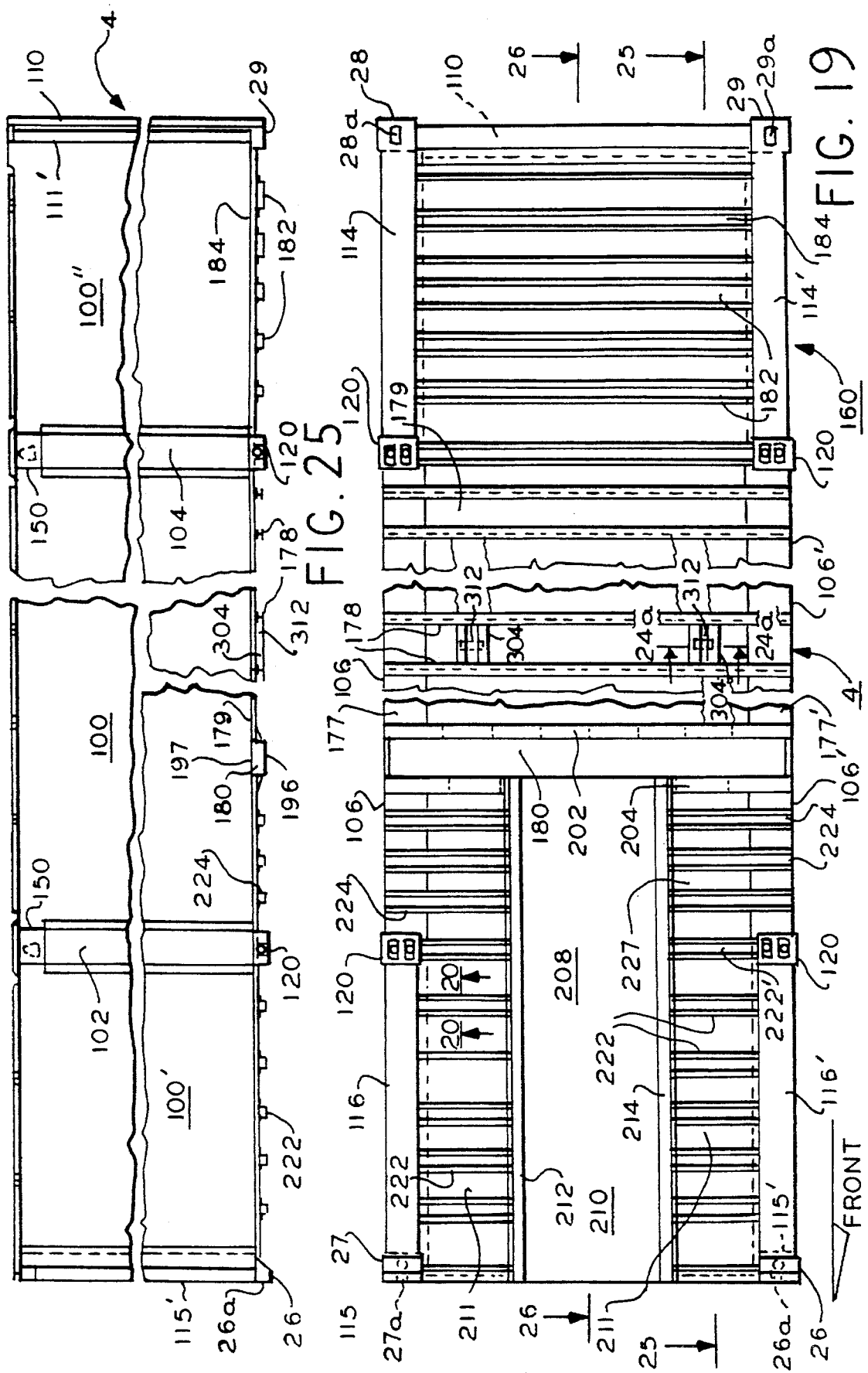

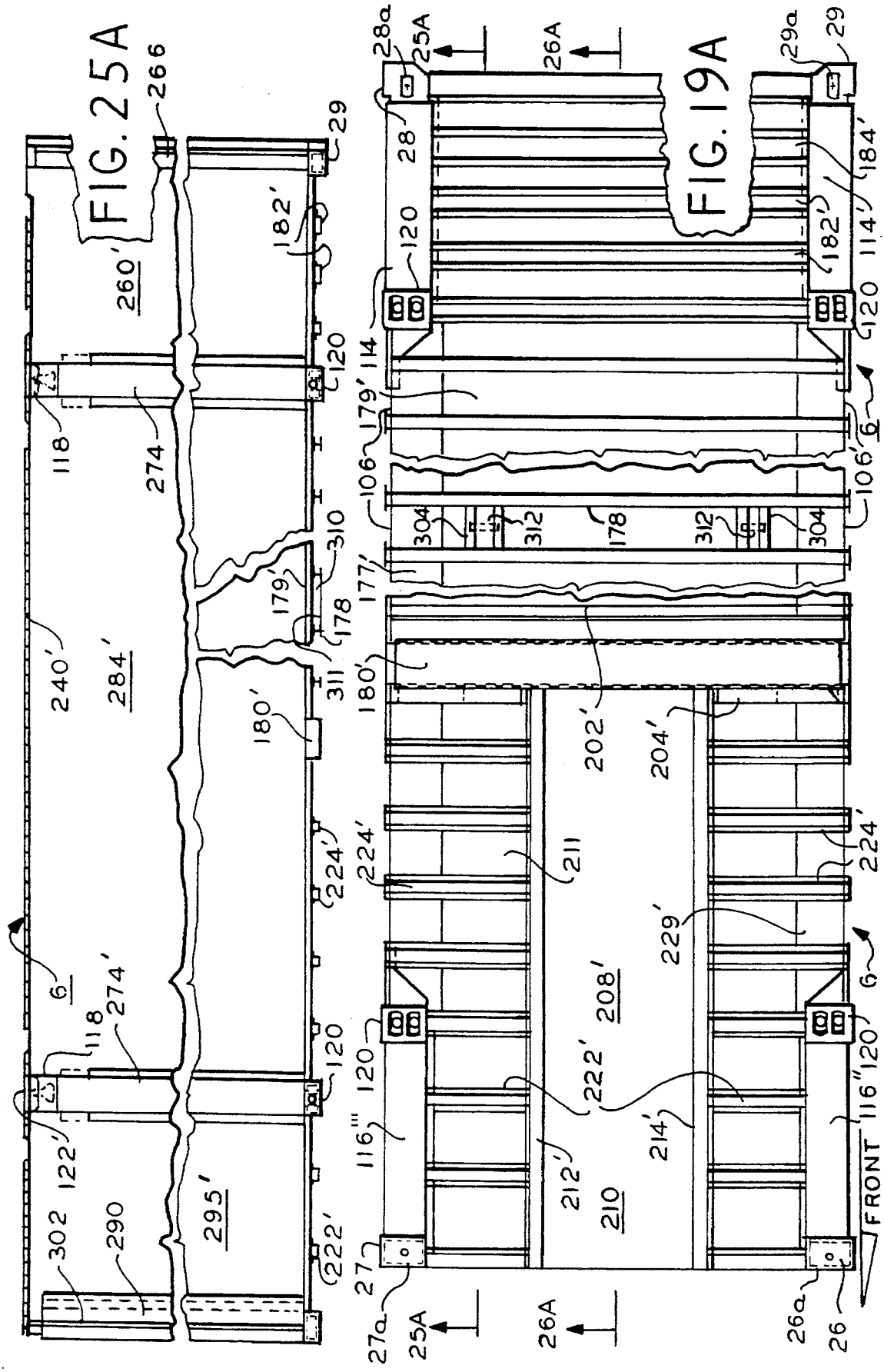

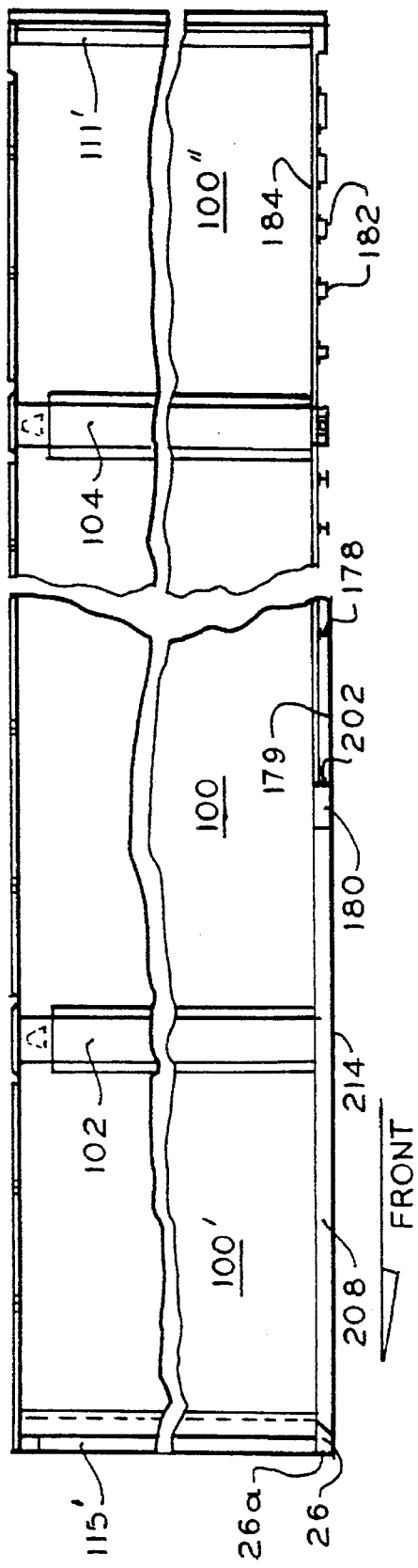
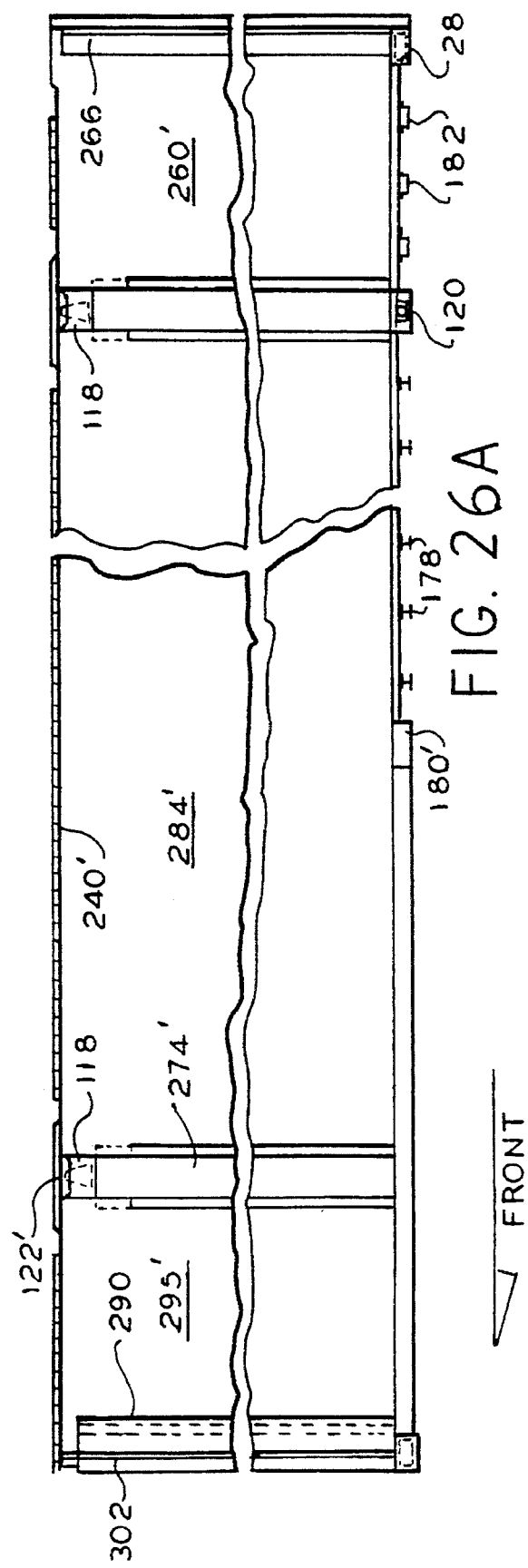

LIGHTWEIGHT CHASSIS-CONTAINER CONSTRUCTION

FIELD OF THE INVENTION

This invention relates to a chassis and container construction for use with a truck tractor, the container being adapted also principally for installation on railroad cars.

BACKGROUND OF THE INVENTION

Cargo containers for use with chassis and for piggyback stacking on railroad cars are in wide use. The containers comprise rectangular volumes elongated sufficiently to be carried fully on a chassis and to be placed on a railroad car in a single or double stacking arrangement. The chassis is one which is sufficiently strong and rigid for hauling over a highway by a tractor if desired but normally is used only for carrying containers from and to a railroad yard or terminal and a local destination. Long distance hauling of the container is by rail car. The chassis receives a set of tandem wheels which is referred to as a bogie and which is fixed or releaseably attached to the chassis rear.

At the front of the chassis is typically a bolster assembly which is a transverse beam having a pair of spaced apart pins extending from its ends and which mate with mating apertures in a container base region typically comprising a pair of steel castings or fabricated members located at the bottom front corners of a container. The container has steel fitments at the bottom rear corners thereof each of which mate with a corresponding twist lock assembly which comprises an upstanding projection which slips into an opening in each of the steel fitments. The twist lock assembly has a lever which is manually rotated to lock each bottom rear fitment in place, locking the container to the chassis.

A railroad car includes upstanding intermediate male members which mate with a female opening in intermediate container bottom castings of the lower most container. An upper container, which rests on top of the lower container on a railroad car, includes a lower bottom steel casting arrangement. Some of the bottom castings of the upper container having a hole which aligns with a hole in an upper casting of the lower container and with the male members located in the railroad car well. The rail car male members do not have a locking arrangement. An interbox connector is manually placed into the holes of the upper castings of the lower container and into the lower bottom casting openings of the upper container. The interbox connecters include a twist lock which is manually locked in place after the upper container is assembled over the lower container. The lower container is generally about 48 feet in length whereas the upper container may be 48 feet or 53 feet in length.

When it is desired to unload the prior art containers from the railroad car, an empty chassis is brought adjacent to the railroad car via a truck tractor. A crane then lifts the upper container off the railroad car via a crane lift assembly which has bayonette fittings which mate with casting apertures in the top sides of each container. The containers each have castings at the upper region thereof at front and rear portions with top facing apertures which mate with the crane lifting mechanism. The crane lifts the container from the railroad car and places it onto the chassis and the container is then locked to the front bolster and rear twist lock assemblies of the chassis.

Typical prior art chassis are rigid elongated structures comprising a relatively heavy pair of parallel steel beams connected by spaced crossed braces. These chassis typically comprise parallel steel I beams which extend from front to rear of the chassis and are about one foot in height, ¼ inch thick and are relatively heavy, adding weight and thus cost to the use of the chassis and container assembly for use between the rail terminal and a local destination.

The upper and lower castings of the containers tend to be relatively bulky, protrude into the interior volume of the container and take away room from cargo space within the container. Cargo space is at a premium and any additional space available for such cargo is valuable. Prior art castings at the upper header regions of the containers being relatively bulky, take up considerable room otherwise unavailable for the cargo. Such castings are located intermediate the container ends. Intermediate posts are employed for carrying loads produced by the upper container in a piggyback stacked railroad car arrangement. Prior containers, originally designed for ships having numerous stacking layers are relatively robust and heavy.

Because the prior art chassis are relatively heavy due to their rigid steel beam construction and due to the fact that prior art containers are also heavy and have castings which interfere with cargo space within the container interior, these container- chassis constructions are not as cost effective as desirable. Also, the load bearing posts of the containers are subject to bending loads due to the location of the upper load bearing casting load support axes. This causes the container support posts to require additional strength, adding weight and cost to the container.

SUMMARY OF THE INVENTION

A need is recognized for a lightweight cargo container for use with a railroad car and a chassis, the container having enhanced interior space for providing enlarged interior cargo handling capability. A need is also recognized for a support for use with a cargo container of the type adapted to be carried by a rail car and by a chassis, the support for receiving lifting means for lifting the associated container. The support comprises a somewhat L-shaped member having a first leg arranged to be parallel to a container sidewall and a second leg normal to the first leg. The legs are sufficiently thin so as to provide negligible intrusion into the interior of the container. The first leg is dimensioned to be substantially co-extensive with a container sidewall and the second leg is substantially co-extensive with a container top wall. The first leg has a first aperture dimensioned to receive a container lifting means therein. The support member has a hollow cavity in each leg in communication with the aperture. The second leg has a second aperture in communication with the cavity. The aperture in the second leg is sufficiently close to the first leg such that a load supported at the second leg aperture via an intermediate support post is substantially borne by the first leg with minimum bending moments.

In accordance with a further embodiment of the present invention, a chassis for releaseably receiving a cargo container comprises an elongated frame structure having a rear end and a front end. The front end includes a goose neck portion adapted to be releaseably attached to the tractor. The frame structure is sufficiently light in weight such that it is flexible between the ends and tends to be relatively unstable for operation over a highway. Chassis means receive a set of rear wheels at the chassis rear end. The frame structure is sufficiently flexible between the front and rear ends such that additional frame stiffening is required for stabilizing the frame structure when pulled by a tractor. Means are provided for releaseably securing a cargo container to the chassis for stiffening the chassis intermediate the chassis ends.

In accordance with a further embodiment, a cargo container for releasable connection to a tractor trailer chassis having front and rear ends comprises a substantially rectangular bottom wall and a substantially rectangular top wall overlying the bottom wall. A plurality of upstanding sidewalls are secured to the top and bottom walls forming an enclosed space with the top and bottom walls. One of the side walls forms a front end and a second opposing sidewall forms a rear end of the container. Means are secured to the container for attaching the front and rear ends and a region intermediate the front and rear ends to the chassis. By attaching the chassis to the container at the intermediate region, a relatively unstable flexible chassis is otherwise stiffened sufficiently to provide a relatively rigid chassis-container structure between the chassis ends.

IN THE DRAWING:

FIGS. 1 and 1A are respective side elevation views of 53 foot uninsulated and 48 foot insulated containers mounted on a chassis in accordance with respective embodiments of the present invention;

FIG. 1B is a side elevation view of a double stacked container assembly on a railroad car employing the 48 foot lower and the 53 foot upper containers of FIGS. 1A and 1, respectively;

FIG. 1C is an end elevation view taken along lines 1C–1C of FIG. 1B;

FIG. 1D is an end elevation view taken along lines 1D–1D of FIG. 1B;

FIG. 2 is a rear elevation end view of the chassis of FIG. 5;

FIG. 3 is a front elevation end view of the chassis of FIG. 5;

FIG. 4 is a plan view of a chassis in accordance with an embodiment of the present invention;

FIG. 5 is a side elevation view of the chassis of FIG. 4;

FIG. 6 is a fragmented side elevation view of the chassis of FIG. 5 taken in the region 6;

FIG. 7 is a sectional fragmented elevation view of a bogie mechanism taken along lines 7—7 of the FIG. 6;

FIG. 7A is a view similar to FIG. 7 showing more of the mechanism of FIG. 7;

FIGS. 8 and 8A are partial sectional fragmented elevation views of the containers of respective FIGS. 1 and 1A taken along respective lines 8—8 and 8A—8A;

FIGS. 9 and 9A are partial sectional fragmented elevation views of the containers of respective FIGS. 1 and 1A taken along respective lines 9—9 and 9A—9A;

FIG. 9B is an end view of a typical lower intermediate rail for a 48 foot container;

FIGS. 10 and 10A are partial sectional fragmented plan views of a portion of the containers of respective FIGS. 1 and 1A taken along lines 10—10 and 10A—10A;

FIGS. 11 and 11A are partial sectional fragmented elevation views taken along lines 11—11 and 11A—11A of FIGS. 1 and 1A, respectively;

Figure 22:
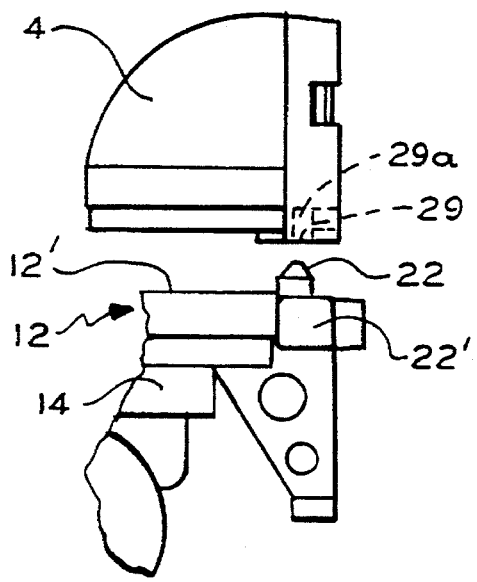
Figure 23:
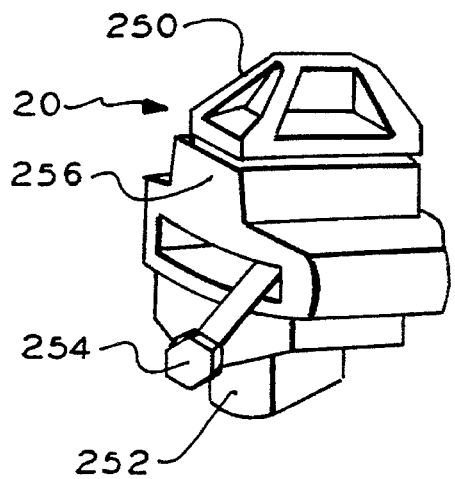
Figure 24:
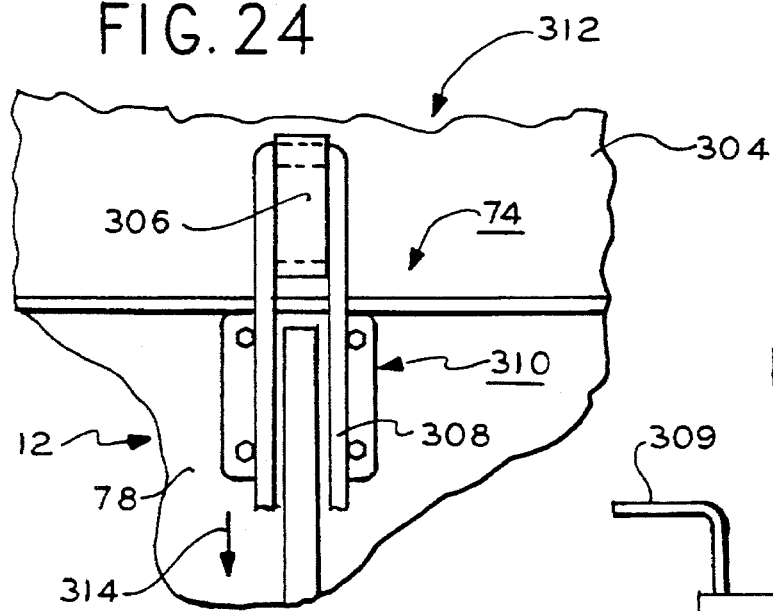
Figure 24A:
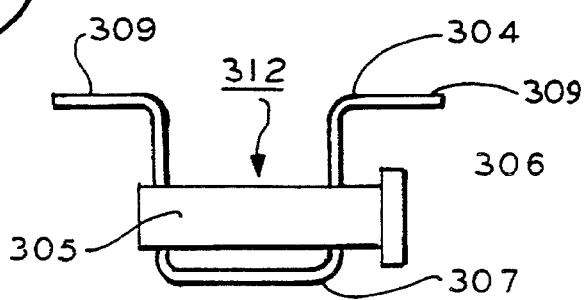

FIGS. 14, 15, 16 and 17 are respective sectional elevation views taken along lines 14—14, 15—15, 16—16, and 17—17 of FIG. 4;

FIGS. 18 and 18A are side partial sectional fragmented elevation views taken along respective lines 18—18 and 18A—18A of FIGS. 1 and 1A;

FIGS. 19 and 19A are respective partial sectional fragmented bottom plan views of a container floor beam structure taken along respective lines 19—19 and 19A—19A of FIGS. 1 and 1A;

FIG. 20 is a sectional fragmented elevation view taken along lines 20—20 of FIG. 19;

FIGS. 21 and 21A are partial sectional fragmented elevation views taken along lines 21—21 and 21A—21A of FIGS. 1 and 1A respectively;

FIG. 22 is a side elevation exploded view of the chassis and container of FIGS. 1 and 1A taken at region 22;

FIG. 23 is a perspective view of an interbox twist lock connector for securing the stacked upper container to the lower container in FIG. 1B;

FIG. 24 is a fragmented side elevation view taken at region 24 of FIGS. 1 and 1A;

FIG. 24A is a sectional view taken along lines 24A–24A, FIG. 19;

FIGS. 25 and 25A are side elevational fragmented sectional views taken along lines 25-25 FIG. 19 and lines 25A–25A of FIG. 19A; and FIGS. 26 and 26A are side elevational fragmented sectional views taken along lines 26-26 of FIG. 19 and lines 26A–26A of FIG. 19A, respectively;

DETAILED DESCRIPTION OF THE PREFERRED EMBODIMENTS

In the drawing identical components are referred to with the same reference numerals Similar components are designated with the same numbers and primed reference numberals in most instances as will be evident by inspection of the Figures. In FIG. 1B, in assembly 2, a railroad car 8 is carrying two stacked containers 4 and 6, upper container 4 being illustrated as a 53 foot container and a lower 48 foot container 6 located in well 7 of car 8. These containers carry cargo within their interior space in a well known way. The car assembly 2 is transported over rail from point to point destinations. At a given destination, the containers 4 and 6 are unloaded from the railroad car 8 onto a respective corresponding chassis 12, FIGS. 1 and 1A, forming respective chassis/container assemblies 10 and 10'. The upper container 4 and the lower container 6 are each loadable onto a separate, but identical, chassis 12 or the same chassis 12 at different times. In FIG. 1A, the lower container 6 is shown on a chassis 12 and in FIG. 1, the upper container 8 is shown on a separate, identical chassis 12, both chassis being stored in a railroad yard terminal for use by the railroad. The chassis 12 of FIG. 1 is expanded in length relative to the chassis 12 of FIG. 1A to accommodate the longer container 4.

In FIG. 4, a relatively light chassis 12 has a goose neck 34 at the front region. Goose neck 34 is unique in that it is preferably about 10% narrower than and about 50% of the vertical height of the prior art goose necks. Bolster 30 is secured by braces 88 to the front of the goose neck 34. The goose neck 34 is connected to the chassis rear section 36 via a first intermediate extendable section 35 and a second truncated triangular intermediate section 37 which diverges rearwardly. Goose neck 34, for example, may have a transverse width of about 32 inches whereas rear section 36 may have a beam center-to-center width of about 43 inches in this embodiment. The narrower goose neck contributes significant weight reduction and prevents unlike chassis and containers from being assembled together inadvertently.

The rear section 36 comprises a rear bolster assembly 38 and a chassis structure 40 which receives bogie 14. The chassis structure 40 comprises a plurality of parallel transverse modified Z-shaped beams 42 connected at their ends to right and left parallel main I beams 41 and 43 which run in a front to rear direction in section 36. In particular, in FIG. 16, the beam 42 has a vertical central web 42', an upper flange 42" extending in one direction from the web and a lower flange 42"' extending from the web in the opposite direction. The beams 41, 42 and 43 may have a web height d" of about 6 inches in this embodiment. Beams 41 and 43 each have an upper flange 41' and 43', respectively, and a vertical web 41" and 43". A pair of diagonally oriented identical C-shaped representative beams 44 and 45 each have a central vertical web 46 and horizontal respective upper and lower flanges 47 and 48. Diagonal beam 45 is connected between transverse beam 42 and main beam 43 and diagonal beam 44 is connected between transverse beam 42 and main beam 41. This arrangement is continued for section 36 with the diagonal beams on opposite sides of a transverse beam forming a somewhat X shape in plan view (FIG. 4). The beams 44 and 45 are mirror images and are otherwise identical and are preferably welded in place. Modified Z-shaped rails 52 and 54 as will be explained relative to FIG. 6 and 7, are welded to the lower edges of the respective vertical webs 43" and 41" of beams 43 and 41. See also FIG. 13B showing transverse beam 49 and diagonal beam 44'.

The flanges 42" and 42'" and web 42' of beam 42 all preferably have the same thickness of about 0.13 inches and are formed from 80,000 psi tensile steel. This is typical for all of the transverse and diagonal beams. Beams 41 and 43 may have an 0.13 inch thick web, ¼ inch thick upper flanges and are also preferably 80,000 psi tensile steel.

In FIGS. 6, 7 and 7A, a pair of rails 52 (only one being shown in FIG. 7, the second rail being on the opposite side of the chassis) each have a respective array of apertures 52'. The arrays of apertures 52' extend in a front to rear direction with the apertures located in equal spaced increments. The rails 52 have a vertical web preferably about 3 inches high, and formed from preferably 0.25 inch thick high tensile steel. The rails 52 preferably have an upper flange 53 of about 4 inches wide and a 1 inch wide lower flange 55. Spaced ribs 57 are welded to rail 52 and web 43" (and web 41") on each side of the chassis.

The bogie 14 comprises a suspension framework 56 to which is attached a conventional pin 60 reciprocating mechanism 58. Mechanism 58 simultaneously extends and retracts pins 60 on each side of the bogie 14 chassis 56 and chassis 12 via lever 61 for mating the pins 60 with a corresponding aperture 52' in the rails 52 for locking the bogie 14 in place. In FIG. 5, the bogie 14 is at its rear most position. A channel 50 is formed by the rails 52 and 54 and the chassis 12 transverse beams 42. The channel 50 is so dimensioned such that the bogie framework 56 slides vertically into the channel 50 in direction 62 at a selected position along the length of rails 52 and 54. This provides a relatively simple way of assembling the bogie 14 to the chassis 12 and a close fit of the bogie framework 56 to rails 52. Once the bogie 14 is in a desired location, normally extended pins 60 are retracted and then extended into the apertures 52', one pin 60 being on each bogie side. Once the bogie is aligned by pins 60 and apertures 52', the bogie chassis 56 is held in place by the weight of chassis 12. Metal clips 53, FIGS. 7 and 7A, further hold the framework to the rails 52 and 54.

Immediately forward of the beams 41 and 43, FIG. 4, is a second set of main front to rear extending converging I beams 64 and 66 forming section 37. Beam 64 is welded to an end of beam 41 and an end of corresponding rail 52 and beam 66 is welded to an end of beam 43 and an end of a second rail 52 on the other chassis side. The beams 64 and 66 have a central web height d' which is the same as the combined vertical web height of I beams 41 and 43 and the vertical web height of rails 52, FIG. 16. Thus, the beam 64 provides a continuum of the combined beam structure formed by a beam 41 and its rail 52. The same is true for beam 66 on the other chassis side. By way of example, height d' may be about 9 inches in this embodiment. The longitudinal main beams 64 and 66 are braced by C-shaped diagonal beams similar to beams 44 and 45, FIG. 16.

Figure 17:
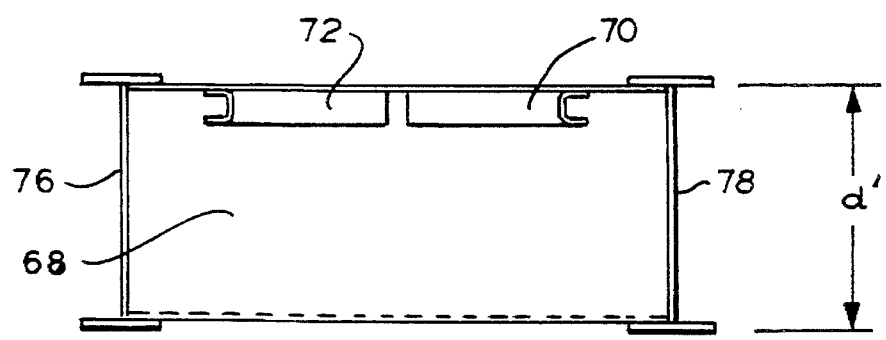

In section 35, FIGS. 4 and 17, the beams 64 and 66 are connected at their other ends to comparably dimensional beams 76 and 78, respectively. A modified Z-shaped transverse beam 68 similar to beam 42 is connected to and between beams 76 and 78. The beam 68 and other parallel transverse beams may have openings (not shown) to lighten the beams. The beams 76 and 78 are connected by respective diagonal C-shaped beams 70 and 72 which are the same construction and otherwise similar to beams 44 and 45, FIG. 16. A pair of clamps 74 are secured to a side of each of beams 76 and 78 for securing a container 4 or 6 thereto at the undersides thereof as will be explained below. Beams 64, 66, 76 and 78 are all preferably formed from 80,000 PSI steel having a web thickness preferably of about 0.13 inches with 3 inch wide ¼ inch thick upper and lower flanges and a web height of about 9 inches.

Figure 13A:
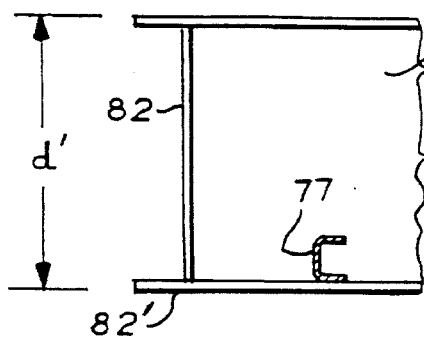
FIGS. 13A and 13B are respective partial sectional elevation views taken along lines 13A—13A and 13B—13B of FIG. 4.
Figure 13B:
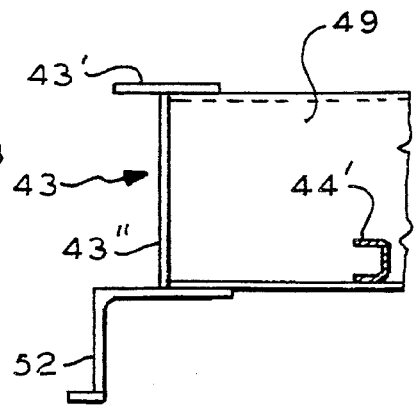
Figure 15:
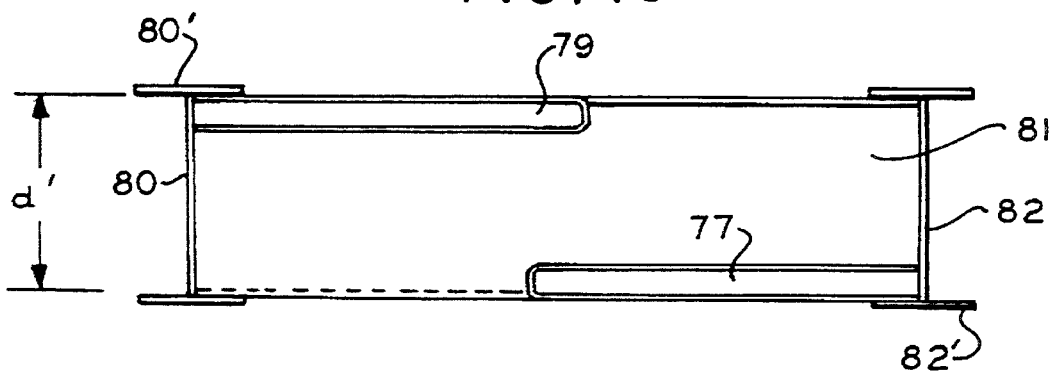
Figure 16:
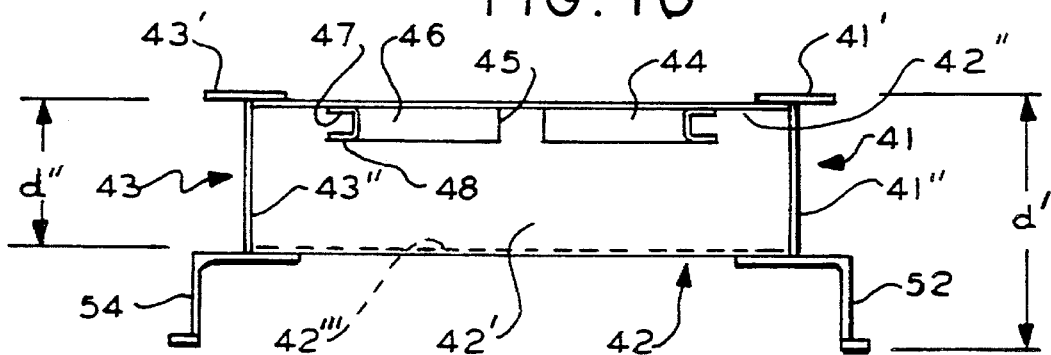

Forward of beams 76 and 78 in intermediate section 35 is a second set of beams 80 and 82, FIGS. 13A and 15. The beams 80 and 82, of the same material and relative dimensions as beams 76 and 78 are respectively slid relative to and pinned to beams 78 and 76 at respective apertures therein similar to the attachment of the bogie 14 to the chassis to form an extension therebetween for extending the length of the chassis as desired. For example, in FIG. 1, an extended chassis 12 is shown for a 53 foot container 4 whereas in FIG. 1A chassis 12 carries a 48 foot container 6. Two or more pairs of apertures 78' formed in beams 76 and 78, FIG. 5, attach the beams together at different longitudinal locations as desired via retractable pins 59' on mechanism 59, FIG. 4, attached to beams 80 and 82.

Transverse beams and diagonal braces are continued for the remainder of section 35. For example, in FIGS. 13A and 15, C-shaped diagonal brace 77 is connected between main beam 82 at its lower flange 82' and transverse beam 81. Beam 81 is a modified Z shape similar to beam 42. A second diagonal beam 79 of the same construction as diagonal beam 77, is connected between main beam 80 at its upper flange 80' and beam 81. The beams 80 and 82 each have a vertical web height d' which is the same as that for beams 64, 66 and beams 76 and 78. Forward of intermediate section 35 is the goose neck 34.

Figure 14:
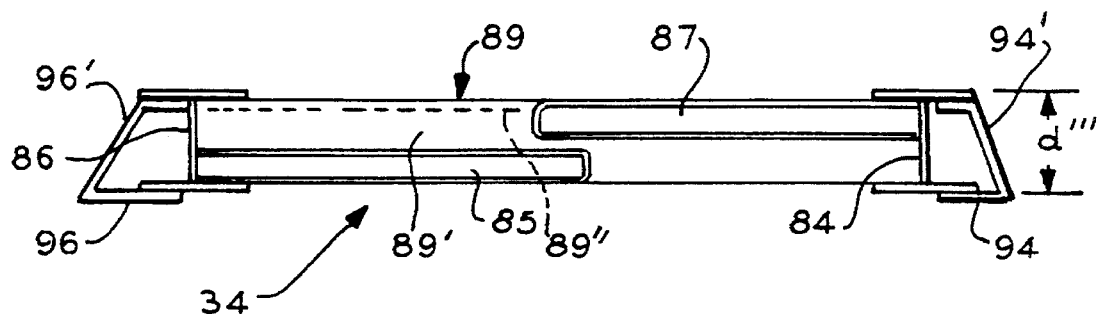

In FIGS. 4 and 14, the goose neck 34 comprises a pair of main parallel I beams 84 and 86 running front to rear. The beams 84 and 86, are also connected by an X arrangement of cross braces, such as braces 85 and 87, and by spaced parallel transverse modified Z-shaped beams. However, the beams 84 and 86 and their braces are narrower in height than those of the remaining beams of the chassis and have a vertical height d''', which is for example about 4 inches or less as compared to 9 inches for distance d' and have a web thickness of about 0.25 inches and ⅜ inch thick flanges formed from 80,000 psi steel. Further, the beams 84 and 86 have an upper surface thereof which is raised above that of the remaining portion of the chassis sections 35, 36 and 37 to receive and mate with the tunnel of a container 4 or 6. A C-shaped transverse beam 89 is forward of and connected to an end of braces 85 and 87. The legs 89' of beam 89 are vertical (in and out of the drawing FIG. 4) and the base 89" is horizontal.

A king pin 90, FIG. 4, is centrally secured to and depends from king pin support brace assembly 92. The kingpin brace assembly 92 is secured to and between the beams 84 and 86.

In FIG. 14, parallel mirror image side beams 94 and 96 are respectively secured to the sides of respective beams 84 and 86 along goose neck 34. Transverse beam 89 and other transverse structures and side beams 94 and 96 form a trapezoidal cross section dimensioned in width and height to closely receive the tunnel of the mating container which rests thereon and will be described below. The beams 94 and 96 comprise a channel member whose upper and lower legs are welded to respective upper and lower flanges of main beams 84 and 86. The base walls 94' and 96' of respective beams 94 and 96 incline outwardly from the top to bottom flanges of beams 84 and 86, respectively.

The thickness of the webs and flanges of the various beams 41, 43, 76, 78, 80, 82, 84 and 86 and that of the transverse beams such as beams 42 and 68, and the diagonal braces such as braces 44, 45 and so on are of such gauge and strength to form a relatively light chassis and are such that the chassis at the bogie 14 is somewhat transversely flexible with respect to the front end at bolster 30. This flexibility is such that the chassis when pulled by a tractor via the kingpin 90 is relatively unstable and generally unsuitable for hauling over a highway without additional structural reinforcement. The chassis 12 therefore is not contemplated to be used for hauling over a highway via a tractor without additional structure. However, the chassis 12 is significantly lighter than comparable prior art chassis by at least 25%. This is significant. Container hauling, however, is intended to be only local between a rail terminal and a local delivery or pick-up point, the containers being hauled long distances by rail car.

Typically, in use, the chassis 12 would not be hauled separately without a container such as container 4 or 6 secured thereto. The reason for this is that at a railroad yard or terminal, one of the containers 4 and 6 when unloaded from a railroad car 8, FIG. 1B, is loaded onto a vacant chassis, FIGS. 4 and 5, stored in the terminal for this purpose. The container is then secured to the chassis via the twist locks 22 at the rear bolster assembly 38, pins 31 and 32 at the front bolster 30 and the clamps 74 which clamp the container thereto at the midsection of the chassis and container. The clamps 74 therefore serve a critical function of forming with the container a structurally rigid chassis assembly. The structural rigidity of a container when clamped at the midsection via clamp 74 to the chassis 12 rigidifies the chassis and thereby substantially eliminates flexibility and instability that otherwise is present in the chassis 12 without the presence of the container secured thereto. The chassis 12 with a container 4 or 6 secured thereto as described is then hauled from a railroad terminal to a local point of destination.

A stiffness problem of the main beams, such as beams 64 and 66, is cyclically occurring damaging flexure in response to road roughness. This flexure is a result of the beam vertical height of 9 inches as compared to prior art beams of 12 inches. Damaging flexure results in fatigue failure of the beams when exposed to numerous cumulative damaging flexure cycles. The container clamped to the main beams precludes such damaging flexure cycling.

At the destination, the container cargo is unloaded in the usual fashion. However, the container at the destination is not removed from the chassis. The container and chassis combination are returned to the railroad terminal empty or with cargo, where the container may then be unloaded from the chassis onto a railroad car and a new loaded container transferred onto the chassis. In any event, it is contemplated the chassis when empty will be maintained solely within the railroad terminal and, if transported, will be transported with a container attached and only locally short distances. Any flexibility and instability of the chassis, by itself therefore, is not a factor because of the local transport of the empty chassis only within the railroad yard confines or to a local point of destination with an attached container. Thus, no empty chassis leaves the railroad terminal and the instability of the chassis over a highway is not a determining factor for the local short distance use of the chassis over a highway because of its structural rigidity when coupled to a container secured thereto.

The flexibility and, therefore, instability of the chassis arises due to the reduced thickness of the various beams forming the chassis and the reduced vertical web heights as compared to prior art beams. Thus a lighter chassis is provided using less steel material and, therefore, permitting additional loads to be carried in the cargo carrying container. Since load limits are provided by various government laws for a given truck size, reduction in weight of the chassis therefore permits increased cargo and, therefore, increased cost effectiveness of the chassis/container assembly. Thus a more efficient chassis is provided which enhances its economic performance.

Containers 4 and 6, FIGS. 1 and 1A, respectively, are substantially similar except for castings and fitments as will be described, container 4 having a 53 foot length and is uninsulated whereas container 6 has a 48 foot length and is thermally insulated. Further, either of the containers 4 and 6 may be uninsulated sheet metal panel members as illustrated by container 4 or may comprise insulating structural foam sidewalls and roof panels as illustrated by container 6. The description of one container, for example container 4, is representative except for the differences or as will be described below.

In FIG. 1, the container 4 comprises a major central sheet metal side panel 100 connected between a first forward intermediate vertical post 102 and a second rearward intermediate vertical post 104, a bottom, preferably aluminum, intermediate horizontal rail 106 (FIG. 9) and a preferably aluminum top intermediate rail 108. The container wall on the other side diametrically opposite side 100 is a mirror image of the side 100. A rear door assembly 110 is connected to corner posts 111 and 111' and to upper rear rails 112, preferably aluminum, and lower rear rails 114, preferably steel, a lower and upper rail being on each side of the container at the rear of posts 104. A panel 100" is between and connected to assembly 110 post 111, post 104, bottom rail 114 and top rail 112.

At the front of the container, a sheet metal panel 100' is connected to an upper front rail 112', preferably aluminum, on each side of the container to and between post 102 and mirror image upright corner supports 115, 115' (FIG. 3). The panel 100' is also connected to lower front rail 116 preferably steel.

A top steel casting 150 is between the intermediate upper rail 108 and the front upper rail 112' and is immediately above post 102. A lower forward steel casting 120 is between lower intermediate rail 106 and front lower rail 116 aligned at the bottom of post 102. A second rearward casting 150 is between the upper rear rail 112 and intermediate upper rail 108 aligned over post 104 and a second rearward lower casting 120 is at the bottom of post 104 between rear rail 114 and intermediate bottom rail 106. As best seen in FIG. 19, front bottom steel fabricated fitments 26 and 27 are at the base of corner posts 115' and 115, respectively, and at the forward end of front bottom rails 116. Rear bottom fitments 28 and 29, which may be apertured plates, are at the base of assembly 110 posts 111 and 111' and connected to respective rear bottom rails 114 on each side. Corner posts 115, 115' and 111, 111' at the container front and rear, respectively, will be described in more detail below in connection with FIG. 10.

The intermediate castings 120 are not secured to chassis 12 but are used to mate with upstanding rail car members (not shown). There are two like mirror image front fitments 26 and 27 and two like mirror image rear fitments 28 and 29. The front fitments 26 and 27 each have respective a forward facing aperture 26a and 27a, FIG. 19. Apertures 26a and 27a engage corresponding chassis front bolster 30 pins 31 and 32, respectively, on the chassis 12, FIG. 4. The rear fitments 28 and 29, FIG. 19, have apertures 28a and 29a which mate with a corresponding respective twist lock 22, FIG. 22, at the rear opposite sides of the chassis 12. Both the upper container 4 and lower container 6 have identical bottom intermediate castings 120 and rear fitments 28, 29. The lower front fitments on container 4 are somewhat different than the corresponding castings on the lower container 6, but serve the same purpose of securing a container to bolster pins 31, 32 on the chassis.

The rear fitments 28 and 29, FIG. 22 project below the bottom of the container 4 (and 6) to rest on chassis support 22', which is below the chassis 12 upper surface 12'. While the front fitments 26 an 27 and rear fitments 28 and 29 on the upper container 4 are not used for attachment to the railroad car 8, they are used to attach that container to a chassis 12. There are also four upper castings 150 at the top of the container.

Figure 12A:
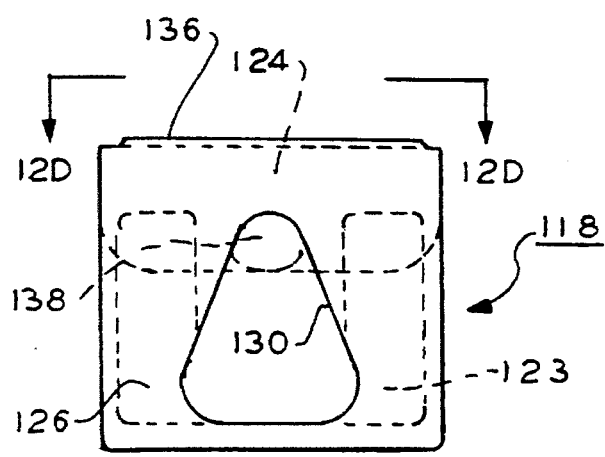
FIGS. 12A, 12B, 12C and 12D are front, side, elevation sectional and plan views, respectively, of a casting employed at the upper intermediate post regions of the container of FIG. 1A.

The top casting 150 aligned over post 102 of the upper container 4, FIG. 8, is of different configuration than the top castings 118 of the lower container 6 to be described below. Casting 150, formed of the same cast steel as is casting 118, is L-shaped having a generally horizontal leg 152 when attached to the container 4 and a vertical leg 154 when attached to the container. The legs 152 and 154 are generally of the same thickness which may be about 1 inch in this embodiment. The vertical leg 154 has a triangular aperture 156 dimensioned similar to that of aperture 130 in casting 118, FIG. 12a. Leg 152 may have a length of about 6 inches in this embodiment and the leg 154 may have a length of about 8 inches. The roof of the container 4 has a header 122 which is butt-welded to leg 152. Post 102 is butt-welded to the leg 154 at its lowermost edge.

In FIGS. 12A–12D, in contrast, top casting 118 over the intermediate post of lower container 6, FIG. 1A, (whether or not insulated) comprises a steel cast support member having a hollow L-shaped (in side elevation view, FIG. 12B) cavity 123. The upper portion of the casting has a leg 124 which is horizontal in use on a container. A vertical leg 126 depends from leg 124. The leg 124 has elongated opening 128 in its top wall. The leg 126 has a triangular aperture 130 in its front external wall. The aperture 130 is dimensioned for receiving a standard mating grappling pin of a lifting crane assembly (not shown). The leg 126 has a thickness t which is approximately the same dimension as that of the post 102', FIG. 8a to be described below. The casting 118 has an L-shaped inner wall 132 having legs which face one another and are interconnected via a gradual curved surface 134. Leg 124 also has a gradually curved surface on wall 132. The legs 124 and 126 are joined at right angles at outer upper corner 136 which is an external corner edge of the mating container.

The leg 124 is relatively thicker than leg 126 and has a thickness t'. The thickness t' is somewhat greater than the header 122' height dimension (FIG. 8A). However, the length of leg 124 is shorter than the comparable dimension of the prior art castings and, therefore, intrudes less into the cargo space of the interior of the container 6. This provides enhanced cargo carrying capability for the container 6. The leg 124 is of sufficient thickness and strength to permit lifting of the loaded container via the casting 118 by a lifting crane pin 138, shown in phantom in FIG. 12A. The dimensions of opening 130 are such that the container containing casting 118 may be lifted via a mating container lifting crane.

By way of example, the thickness of leg 124 between cavity 123 and its top surface may be about 1.1 inches. The leg 126 between cavity 123 and its exterior front surface to the left in FIG. 12b has a thickness that tapers at the top of opening 130 from about 0.875 inches to a thickness of about 0.37 inches at its lowermost end adjacent to the bottom of cavity 123. The thickness of the interfacing wall 132 at curved interface 134 and adjacent portion of the legs 124 and 126 may be about 0.38 inches. The thickness t of leg 126 may be about 1.9 inches whereas the thickness t' of leg 124 may be about 3 inches. The overall height of the casting 118 from its top surface at corner 136 to the bottom of leg 126 may be about 7 inches and the length of leg 124 may be about 6 inches. The width of the casting in FIG. 12D from the top to the bottom of the drawing may be about 8 inches. This casting when fabricated of cast steel comprising weldable carbon or HSLA steel has a minimum yield strength of 35,000 psi, a minimum ultimate strength of 65,000 psi and a minimum elongation of 22%.

Figure 12B:
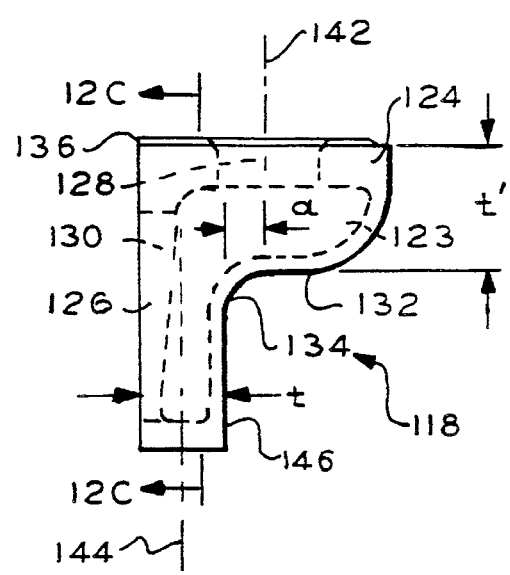
Figure 12C:
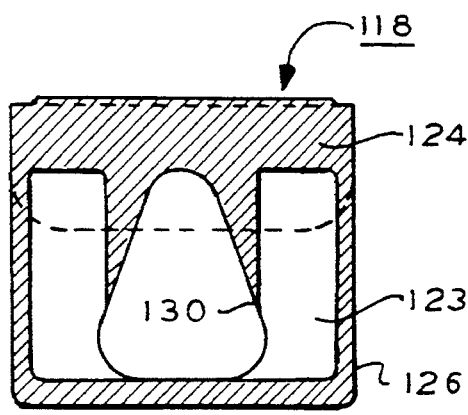
Figure 12D:
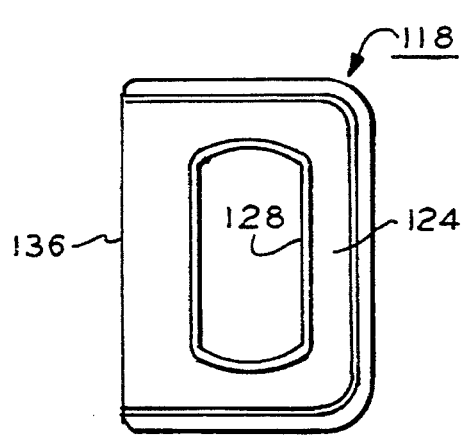

The axis 142, FIG. 12B, defined by opening 128 is displaced from the center of the leg 126 along axis 144 a minimum distance. This distance is approximately 2 inches. This distance between axes 142 and 144 is important because the aperture opening 128 receives along axis 142 an interbox connector 20, FIG. 23, on which upper container 4, FIG. 1B, lower casting 120 rests. The opening 120' of casting 120, FIG. 8, is aligned on axis 142. The interbox connector 20, FIG. 33, causes the load of an upper container 4 at each of the upper castings 118 of the lower container 6 to be concentrated along axis 142. This axis being offset from the axis 144 by about 2 inches and from the post 274 centerline CL, FIGS. 10A and 12B, distance a, about 1 inch in this embodiment, minimizes bending moments on post 274 when the upper container 4 is resting on the lower container 6.

In the prior art, the distance between the upper corresponding aperture 128 and the corresponding leg 126 at which the panel or post 102 is connected is significantly greater, for example 4 inches, inducing greater bending moments on such a load support panel or post. Such bending moments therefore require the post or panels to be of heavier duty construction to minimize the effect of such bending loads. By minimizing these bending moments, the container frame components and the panels may be constructed of lighter weight materials, i.e., lighter gauge, and thinner, as compared to prior art structures, therefore, reducing the overall weight of the container. Further, the casting 118 having a hollow cavity 123 and of smaller dimensions is also of lighter weight construction than prior art castings. Thus, the casting 118 provides enhanced performance in a cargo container.

In FIG. 19, floor assembly 160, which is lighter than prior art assemblies, includes rear steel rails 114 and 114', front steel rails 116 and 116', side rails 106 and 106', front fitments 26 and 27, rear fitments 28 and 29 and intermediate castings 120. In FIGS. 9, 9B and 19, a typical intermediate rail 106 comprises a vertical member 174 and a horizontal leg 176. Leg 176 supports an aluminum extruded floor 177. Transverse floor support I beams 178 are welded and bolted to the member 174 and leg 176. I beams 178 are secured to the rail 106' on the opposite side of the floor in similar fashion. A wood floor 179 is supported by beams 178. Beams 178 are connected across the transverse region of the floor of the container in a parallel array between transverse bolster 180 and castings 120 rearward of the bolster 180. An array of different width spaced inverted U-shaped transverse rearwardly positioned beams 182 form an inclined downwardly sloping floor 184, FIGS. 19 and 25, at the rear between the rearmost castings 120 and rear fitments 28 and 29.

A typical representative bottom rear rail 114 is illustrated in FIG. 18. The rail 114 may be used with sheet metal or foam side panels as illustrated in FIGS. 18 and 18A. The rear rail 114 includes a vertical upstanding member 186 at one edge of an inwardly extending horizontal member 188 and a vertical member 190 depending from member 188 at an opposite edge of member 188. The array of beams 182 are welded to the leg 190 in spaced arrangement. The beams 182 have different heights to provide a sloping floor 184. A side panel 100" comprises a sheet metal panel member (or spaced panel members as desired) riveted to the vertical leg 186 of the lower rail 114 and to vertical depending leg 109 of upper rear rail 117.

In FIGS. 19 and 25, the intermediate floor bolster 180 comprises a U-shaped transverse steel member 196 secured to a flat plate 197. The bolster 180 ends are secured to an end of two sections of rails 106 and 106' on each side. Aluminum floor extrusions 177, 177', wood floor 179 and I beams 178 are on one side of bolster 180. A pair of transverse extensions 202 and 204 are welded to the bolster 180 sides. The extensions 202 and 204 are supported by a corresponding set of spaced braces (not shown). The extensions 204 extend for only a portion of the length of and on one side of the bolster 180 on each side of tunnel 208.

The tunnel 208 is formed of sheet metal in the floor of the container at the forward end and is illustrated in FIGS. 11, 19, 21 and 26. The tunnel 208 is formed by two opposing channel members 212 and 214 which are mirror images of each other and which extend in a front to rear direction in spaced relation as shown. In FIGS. 11 and 21, only one side of the tunnel is shown. The members 212 and 214 are identical but are secured in mirror image fashion. Channel member 212 is representative and comprises a base wall 216, an upright sidewall 218 which is normal to the wall 216 and a second sidewall 220 which is inclined relative to the base wall 216 to form a trapezoidal channel-shaped tunnel 208 between members 212 and 214. A floor 210, which is sheet metal, is welded to the longitudinal upstanding edges of the channel walls 218 and 220. The floor 210 extends for the width and length of the tunnel 208 terminating at the front of bolster 180, FIG. 19. The region of the tunnel 208 between the channel members 212 and 214 is hollow and closely receives the trapezoidal goose neck 34 of the chassis 12. The goose neck 34 and tunnel 208 are closely dimensioned so that there is no vertical or horizontal play therebetween. There may be slight, e.g., 0.25 inches, side-to-side transverse play therebetween. The entire sides of the tunnel 208 are inclined to form a wedge-like fit with the goose neck.

An array of transverse beams 222, FIGS. 19 and 21, are welded at one end to leg 218 of a channel member 212. A wood floor panel 211 is secured between the rail 116 leg 117 and member 212 leg 218 and between beams 222 on the upper surface of flanges 221 of beams 222. The other end of beams 222 are welded to front rail 116 leg 117. A similar array of beams 222 and floor panels 211 are disposed on the opposite side of the tunnel 208 between channel member 214 at one end and rail 116 at the other end. In FIG. 20, a representative beam 222 comprises a C-shaped channel beam 223 and an inverted hat beam 225 having flanges 221 welded together and to rail 116 at a beam end.

In FIGS. 11 and 19, an array of beams 224 are connected at one end to channel member 212 and at the other end to rail 106 between a front casting 120 and bolster 180 on each side of tunnel 208. These beams are longer than beams 222, but of the same cross section as shown in FIG. 20. In FIG. 11, wood floor panel 211 is supported by beams 224 in a manner similar to beam 222, FIG. 20. Panels 211 are between extruded aluminum floor 229 and member 212 on each side of tunnel 208, floor 229 being secured on the horizontal leg 176 (FIG. 9B) of rail 106 and on the flanges 225 of beam 224.

The floor assembly 160 is unique because unlike prior art container floor assemblies, assembly 160 rests fully on the mating chassis 12 for the full extent that the assembly 160 overlies the chassis. In prior art assemblies, the floor is substantially suspended over the chassis by way of the castings. This requires the prior art floor assemblies to have a heavier, more robust construction. The various floor assembly 160 support beams in constrast can be made of lighter gauge material and of less robust beam construction. This is because the floor assembly 160 is supported directly by the chassis which bears the loads carried by assembly 160. This is an important advance in this art.

In FIG. 8, a transverse box-like beam 122 forming a header is connected to and between legs 152 of opposite castings 150 on the sides of the container 4, only one casting 150 and side of the container being shown, the other side being a mirror image. The casting 120 at the bottom of post 102 is a rectangular hollow cast steel block, with two lower spaced apertures 120' and 120". Aperture 120" is located for receiving a rail car upstanding member (not shown) in standard ISO (International Standard Operation) configuration. Aperture 120' is located aligned on axis 142 for reasons to be explained.

In FIGS. 9 and 11, sheet metal side panels 100 including spaced vertical ribs 101 are riveted to the rail 106 vertical member 174. The upper edge of the side panel 100 is riveted to vertical depending leg 109 of upper intermediate rail 108. In FIGS. 18 and 21, front and rear side panels 100" and 100' respectively, are attached to front and rear steel top rails 112 and 112', which are similar to rail 108. Rail 112, which is representative, comprises a U-shaped channel portion 242 and a vertical depending leg 109 to which the panel 100" is riveted. An array of transverse bows 246 are riveted to the channel portions 242 of the upper rails. The bow 246 is W-shaped and is one of an array of bows spaced along the length of the container connected between rails 108, 112' and 112 on the sides of the container top. A header 122, in contrast, is at the top of posts 102 and 104 only.

In FIG. 10, a typical post 102 comprises two back-to-back hat-shaped-shallow channel members 105 having two flanges 107 which are welded together. The central portion forms a flattened narrow hollow beam 105. The beam may be ½ inch thick and 8 inches wide. The flanges 107 are riveted to the side panel 100 on one side and to a side panel 100' on the other side. The panel 100', which may comprise 0.144 sheet aluminum which is typical, is between the post 102 and the front post 115. The members forming Beam 105 may be 0.13 inch thick steel. The rear intermediate post 104 is of the same construction as post 102 and is connected to panel 100".

The front corner post 115, which is representative, is an L-shaped member with a relatively thin side leg 117 of spaced sheet metal and a second front leg 119, the legs lying in mutually perpendicular planes. Leg 119 is of greater spacing thickness than leg 117. An exterior metal front panel 123 is secured to leg 119. Panel 100' is riveted to leg 117. A plywood interior lining panel 125 is fastened to the interior of leg 119. Rear post 111 comprises a sheet metal U-shaped channel member 127 butt welded to a flat plate 127'. This end of plate 127' is bent at 127". The door assembly 110 is attached to the post 111 and 111'). It should be understood while one configuration is disclosed in a preferred embodiment of the sheet metal container 4, the different structures being given by way of illustration, other arrangements may be provided.

In FIG. 23, conventional interbox connector twist lock 20 comprises an upper rotatable head 250, a lower rotatable head 252 and a lever 254. A stationary body 256 rotatably receives the heads 250 and 252 and the lever 254. The lower rotatable head 252 is inserted in the aperture 128 of leg 124 of the upper casting 118, FIGS. 12A–12D, of lower container 6. The twist lock upper head 250 is inserted in aperture 120' of the lower casting 120 of the upper container 4 when installed in piggyback fashion on a railroad car 8, FIG. 1B. A twist lock 20 is installed at each of the castings 120. The lever 254 is rotated to rotate the heads 250 and 252 relative to the body 256 to lock together the castings 118 and 120 of the lower and upper containers, respectively.

In FIG. 8, the lower casting 120 opening 120' is aligned on axis 142. This axis is the same axis 142, FIG. 12B, of the upper casting 118, aperture 128. Thus, the twist lock 20, FIG. 23, is inserted in apertures 120' and 128 of the lower and upper castings, respectively, and is aligned on axis 142. The load of the upper assembly, FIG. 8, is transferred via the casting 120 to the upper casting 118 of the lower assembly 6 along axis 142. This load is transferred along axis 142 closely spaced from the center line of the post 102, a matter of one inch or so. This reduces the bending moment on the post 102 as discussed above due to the narrow spacing of the axis 142 to the post 102 and panel 100 interior surface 102'. This post 102 may be of relatively light gauge and narrow thickness as discussed above as compared to prior art posts.

In FIG. 1B, lower container 6 uses an alternative construction employing an insulated rigid thermoplastic polyurethane foam construction. This container is shown in FIGS. 8A, 9A, 10A, 11A, 18A, 19A an 26A. In referring to these Figures, only significant differences will be pointed out since most of the structures are similar in the two sets of containers notwithstanding the added thickness of the foam panels. In FIG. 10A, end foam panel 260 is sandwiched between an interior metal plate 262 and an external metal plate 264 to form composite panel 260'. The panel 260 and plates 262 and 264 are riveted to rear post 266 formed by two L-shaped members 268 and 270. The channel member 268 has a flange 269 which is attached to plate 262 and channel member 270 has a flange 272 to which plate 264 is riveted in spaced relation to plate 262. The two channel members 268 and 270 form a hollow post. Intermediate post 274 comprises a U-shaped channel member 276 and a plate member 277. A pair of spaced flanges 278 and 280 extend from opposite sides of the channel member 276 spaced from the plate 277 to which the plates 262, 264 and foam panel 260 are riveted on one side of the post 274. The central main side panel 284" comprises a pair of spaced metal skin plates 281 and 282 and foam panel 284 therebetween riveted to the opposite sides of post 274 at one end and identical post 274' at the other end.

Forward side panel 295' comprises foam layer 295 sandwiched between metal skin plates 291 and 293, panel 295' being attached to post 274' at one edge. The other edge is attached to front corner post 290. The front corner posts 290 of the container 6 are each formed in each mirror image fashion by an L-shaped hollow support member having an inner leg 292 to which is riveted internal sheet metal plate 291 and an outer leg 296 to which is riveted external metal plate 293. A second outer leg 294 is in a series of bends forming legs 296 and 298, the latter of which is riveted to inner plate 291. A front plywood liner 302 is secured to the post 290 leg 300. The foam sandwich panels 260', 284' and 295' are secured to lower and upper side rails as illustrated in FIGS. 9A for the lower rail 106, and upper aluminum side rail 108', which differs from rail 108 to allow for the thicker foam panel 284' in depending leg 109'. The roof is formed of a foam panel 240' connected between headers 122 and the forward intermediate posts 274, 274' and rearward posts 266, 266'.

By employing the intermediate posts 274 and 274', relatively light-weight corner post 290, FIG. 10A and post 266 may be provided which need not bear large loads. None of the panels whether formed of thermal insulating panels or uninsulated employing metal plates need be of such heavy construction so as to support a load. The load of an upper container 4 is borne by the upright posts 274 and 274' which is supported by the lower post support castings 120.

The chassis 12 is engaged with the containers 4 or 6 by lowering the container onto the chassis sufficiently so that the tunnel 108 of the container slides onto the goose neck 34 and the container is slid forward until the appropriate openings 26a and 27a in the forward castings 26 and 27 engage the pins 31, 32 of the bolster 30 at the chassis front. Once those pins and apertures are engaged, the rear fitments 28 and 29 of the container are lowered on to the corresponding twist locks 22, FIG. 22. When the lower openings in the lower fitments 28 and 29 at the rear of the container 6 receive the respective twist locks 22, lever 254 is rotated and locks the twist lock 22 to the fitment 28 or 29. This locks the container 4 or 6 in place on the chassis. The clamps 74 on each side of the chassis 12, FIG. 24, are engaged to lock the container 4 or 6 midsection to the chassis 12.

In FIG. 24, clamp 24 comprises a latch mechanism 310 and a mating hook assembly 312. Latch mechanism 310 is operated by a conventional linkage (not shown) secured to the chassis 12. Hook assembly 312 comprises a rectangular in transverse section bar 305 having a flange 306 at one end. The beam 304, FIG. 24A, comprises a channel member 307 which is welded at its ends between and to adjacent transverse beams 178 of the container floor. The channel member 307 has two outwardly extending flanges 309. A hook assembly 312 is adjacent to each side of the container as shown in FIG. 19. The flange 306 forms a hook for receiving shackle 308 of latch assembly 310. The clamp 74 preferably is about 25 feet from the rear of the container.

Shackle 308 is engaged with the hook 306 and pulled in the direction 314 by the latch mechanism (not shown) to lock the shackle 308 to the hook 306. A latch assembly 310 is on each side of the chassis 12 and rigidly locks the central portion of the chassis (in the front to rear direction) to the central portion of the lower container 6. Once the chassis 12 is locked to the relatively rigid container at the midsection thereof, the container rigidity is transferred as a reinforcing rigidifying member to the chassis 12. This is important because the chassis 12 without a container is not intended to be transported over a highway, therefore, need not have a container connected thereto and can be relatively flexible and somewhat unstable. However, for local travel from the rail terminal, the container is firmly secured to the chassis via the clamps 74 and other structure and, thus, the chassis 12 is rigid and stable.

Since the chassis 12 supports the container floor assembly, this assembly is not constructed to support a lift truck, for example, used to load and unload the container. For this further reason the container can be constructed lighter than prior art containers.

It may be appreciated that various embodiments have been described herein for the different structures. It will be appreciated by those of ordinary skill in the art that variations of these structures are contemplated within the scope of the appended claims.

What is claimed is:

1. A lightweight chassis for releasably receiving a cargo container, said chassis comprising:

an elongated frame structure having a rear end and a front end, said frame structure including a goose neck portion adjacent to the front end and adapted to be releasably attached to a tractor, said structure including at least one pair of spaced beams extending in a front to rear direction in the region between the front and rear ends;

means for receiving a set of rear wheels at said rear end;

said at least one pair of spaced beams each being dimensioned such that the beams are sufficiently flexible in the region between the front end and the rear end to cause cyclically occurring damaging flexure stress in the beams during use such that additional stiffening is required for stiffening and stabilizing the beams to preclude said cyclically occurring damaging flexure stress; and means for releasably securing said cargo container to said frame structure for stiffening said beams in the region intermediate the front and rear ends to substantially preclude said damaging flexure stress.

2. The chassis of claim 1 wherein said frame structure comprises a lattice brace arrangement oriented substantially parallel to a plane.

3. The chassis of claim 1 wherein the frame structure has a given transverse width, said goose neck portion having a transverse width smaller than said frame structure transverse width.

4. The chassis of claim 1 wherein said frame structure lies on an axis, said goose neck portion having opposing side walls adapted to mate with opposing walls of said container, said opposing side walls of the gooseneck portion lying in a first see of intersecting planes anti the opposing walls of the container lying in a second set of intersecting planes, said first and second sets of planes each forming mating trapezoidal shapes in a direction transverse said axis.

5. The chassis of claim 1 wherein said container has four corners defining a rectangular shape in a plane parallel to said frame structure, said means for releasably securing including container locking means secured to the frame structure for securing said container to the frame structure at a region adjacent to the corners, said at least one pair of beams including clamp means located in the region intermediate said front and rear ends for clamping said container to said beams to thereby stiffen the beams with said container at said intermediate region.

6. The chassis of claim 1 wherein said goose neck portion and frame structure outside said goose neck portion have respective surfaces on which said container is adapted to rest, said surfaces lying in different planes.

7. The chassis of claim 1 wherein said frame structure comprises a pair of parallel beams at said goose neck portion having a web and a pair of spaced flanges, said web being no more than about four inches in height.

8. The chassis of claim 7 wherein said frame structure comprises a plurality of sections, each comprising lattice frame means including said at least one pair of spaced beams extending in a front to rear direction and diagonally arranged braces connected between said at least one pair of spaced beams, said at least one pair of spaced beams having a vertical height relative to gravity of no more than about 9 inches.

9. The chassis of claim 1 further including said container secured to said frame structure, said chassis and container each having opposing sides, said container having a front end and a rear end, said means for securing including means for securing said container front and rear ends to respective corresponding frame structure front and rear ends and a region of said container intermediate said container and chassis front and rear ends to said at least one pair of spaced beams.

10. The chassis of claim 1 wherein said frame structure comprises a first pair of spaced beams forming said goose neck portion connected to said at least one pair of beams forming the remainder of said frame structure, each pair of beams being interconnected with a brace arrangement, none of the beams having a vertical height relative to gravity of more than about 9 inches.

11. The chassis of claim 10 wherein said first pair of beams have a narrower transverse spacing than the at least one pair of beams, said structure including a third pair of beams interconnecting the first and second pair of beams, said third pair increasing in transverse spacing from front to rear along said chassis.

12. The chassis of claim 1 wherein said spaced beams at said rear end each having a web, an upper flange extending inwardly of said chassis from the web toward the other beam of the pair and a lower flange extending outwardly away from the chassis and said other beam, said web including an array of apertures for receiving a bogie connecting pin arrangement, said webs and chassis forming a channel and being dimensioned to receive a bogie frame therebetween.

13. The chassis of claim 1 wherein said at least one pair of spaced beams each including a web and at least one flange, each web having a length, a vertical height and a thickness, each flange having a length, a width and a thickness, the web heights being dimensioned such that the at least one pair of beams exhibit said damaging flexure stress.

14. A lightweight chassis for releasably receiving a cargo container, said chassis comprising:

an elongated frame structure having a rear end and a front end, said front end including a goose neck portion adapted to be releasably attached to a tractor, said structure including at least one pair of spaced beams extending in the region between the gooseneck portion and said rear end;

means for receiving a set of rear wheels at said rear end;

each beam being dimensioned such that the beams are sufficiently flexible in the region between the gooseneck portion and the rear end to cause cyclically occurring damaging flexure stress in the beams during use such that additional stiffening is required for stiffening and stabilizing the beams to preclude said cyclically occurring damaging flexure stress; and means for releasably securing said cargo container to said beams for stiffening said beams in the region intermediate the gooseneck portion and rear end to substantially preclude said damaging flexure stress.

* * * * *

UNITED STATES PATENT AND TRADEMARK OFFICE
CERTIFICATE OF CORRECTION

PATENT NO. : 5,454,597                          Page 1 of 2
DATED      : October 3, 1995
INVENTOR(S): Michael I. Thomas, Charles R. Fetz, Daniel J. McCormack It is certified that error appears in the above-indentified patent and that said Letters Patent is hereby corrected as shown below:

Column 16, line 4, change "see" to --set--;
change "anti" to --and--.

Column 18, line 13, add the following claim:

--15. A lightweight chassis for releasably receiving a cargo container, said chassis comprising:

an elongated frame structure having a rear end and a front end, said frame structure including a goose neck portion adjacent to the front end and adapted to be releasably attached to a tractor, said structure including at least one pair of spaced I-beams extending in a front to rear direction in the region between the gooseneck portion and the rear end;

means for receiving a set of rear wheels at said rear end;

said at least one pair of spaced I-beams each having a vertical height of no more than about 9 inches; and

UNITED STATES PATENT AND TRADEMARK OFFICE
CERTIFICATE OF CORRECTION

PATENT NO. : 5,454,597
DATED : October 3, 1995
INVENTOR(S) : Michael I. Thomas, Charles R. Fetz, Daniel J. MccCormack It is certified that error appears in the above-indentified patent and that said Letters Patent is hereby corrected as shown below:

means for releasably securing said cargo container to said frame structure for stiffening said at least one pair of spaced I-beams in the region intermediate the gooseneck portion and rear end.--

Signed and Sealed this

Sixteenth Day of January, 1996

Attest:

BRUCE LEHMAN

*Attesting Officer*     *Commissioner of Patents and Trademarks*